United States Patent
Medley et al.

(10) Patent No.: US 8,844,596 B2
(45) Date of Patent: *Sep. 30, 2014

(54) CENTRAL TIRE INFLATION WHEEL ASSEMBLY, VALVE AND CENTRAL TIRE INFLATION SYSTEM

(75) Inventors: Martin A. Medley, Bradenton, FL (US); Douglas P. Miller, New Berlin, WI (US); Donald E. Blackman, Bradenton, FL (US); Thomas Varghese, Pewaukee, WI (US)

(73) Assignee: Global Engineering Marketing LLC, Bradenton, FL (US)

( * ) Notice: Subject to any disclaimer, the term of this patent is extended or adjusted under 35 U.S.C. 154(b) by 845 days.

This patent is subject to a terminal disclaimer.

(21) Appl. No.: 12/967,745

(22) Filed: Dec. 14, 2010

(65) Prior Publication Data

US 2011/0175716 A1    Jul. 21, 2011

Related U.S. Application Data

(63) Continuation-in-part of application No. 12/568,805, filed on Sep. 29, 2009, now Pat. No. 8,307,868.

(60) Provisional application No. 61/100,812, filed on Sep. 29, 2008, provisional application No. 61/286,616, filed on Dec. 15, 2009.

(51) Int. Cl.
*B60C 29/02* (2006.01)
*F16K 15/20* (2006.01)
*B60C 23/00* (2006.01)

(52) U.S. Cl.
CPC ............ *B60C 23/003* (2013.01); *B60C 23/002* (2013.01)
USPC ........... 152/428; 152/415; 301/5.24; 137/224

(58) Field of Classification Search
USPC ................. 152/415, 417, 427, 428; 137/224; 73/146.3; 417/233; 340/442; 301/5.24
See application file for complete search history.

(56) References Cited

U.S. PATENT DOCUMENTS

| 2,928,417 A | 3/1960 | Buckner et al. |
| 5,240,036 A | 8/1993 | Morris |

(Continued)

FOREIGN PATENT DOCUMENTS

| DE | 3844267 A1 | 7/1990 |
| EP | 0564113 A1 | 10/1993 |

(Continued)

*Primary Examiner* — Kip T Kotter
(74) *Attorney, Agent, or Firm* — Boyle Fredrickson, S.C.

(57) ABSTRACT

The present invention is a valve for use in a central tire inflation system including a casing securable to the rim of a vehicle in communication with the tire that houses a main body connectable to a pressurized fluid supply of the central tire inflation system, and a valve member moveable within the main body to control the flow of air through the valve. The valve can be mounted flush on the exterior surface of the rim or in a recessed position within the rim, and can be connected to a manifold that is able to control the flow of pressurized fluid from the central tire inflation system to each valve and tire connected to the valve. The operation of the manifold and pressurized fluid supply can be controlled utilizing a controller operably connected to the manifold and fluid supply, and to sensing devices that supply information regarding the operational conditions of the vehicle to the controller to assist in adjusting the inflation of the tires as necessary.

14 Claims, 21 Drawing Sheets

(56) References Cited

U.S. PATENT DOCUMENTS

| | | | |
|---|---|---|---|
| 5,261,471 A | * | 11/1993 | Freigang et al. ............... 152/415 |
| 6,144,295 A | * | 11/2000 | Adams et al. ................. 340/442 |
| 6,474,383 B1 | | 11/2002 | Howald et al. |
| 7,168,468 B2 | | 1/2007 | Wang et al. |
| 7,686,051 B2 | | 3/2010 | Medley et al. |

FOREIGN PATENT DOCUMENTS

| | | |
|---|---|---|
| GB | 2446531 A | 8/2008 |
| WO | WO00/34060 A1 | 6/2000 |
| WO | WO2010/037073 A2 | 4/2010 |

\* cited by examiner

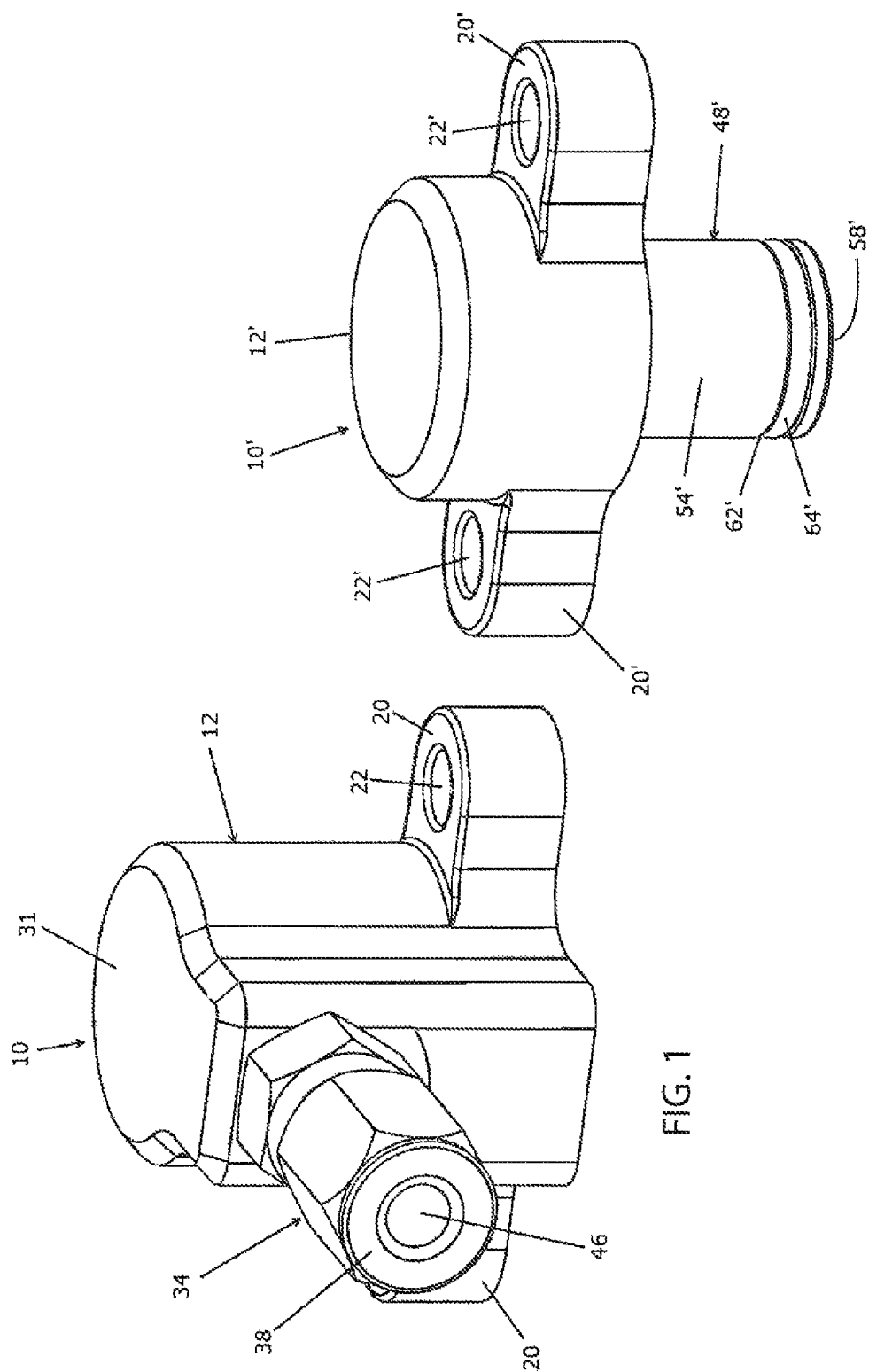

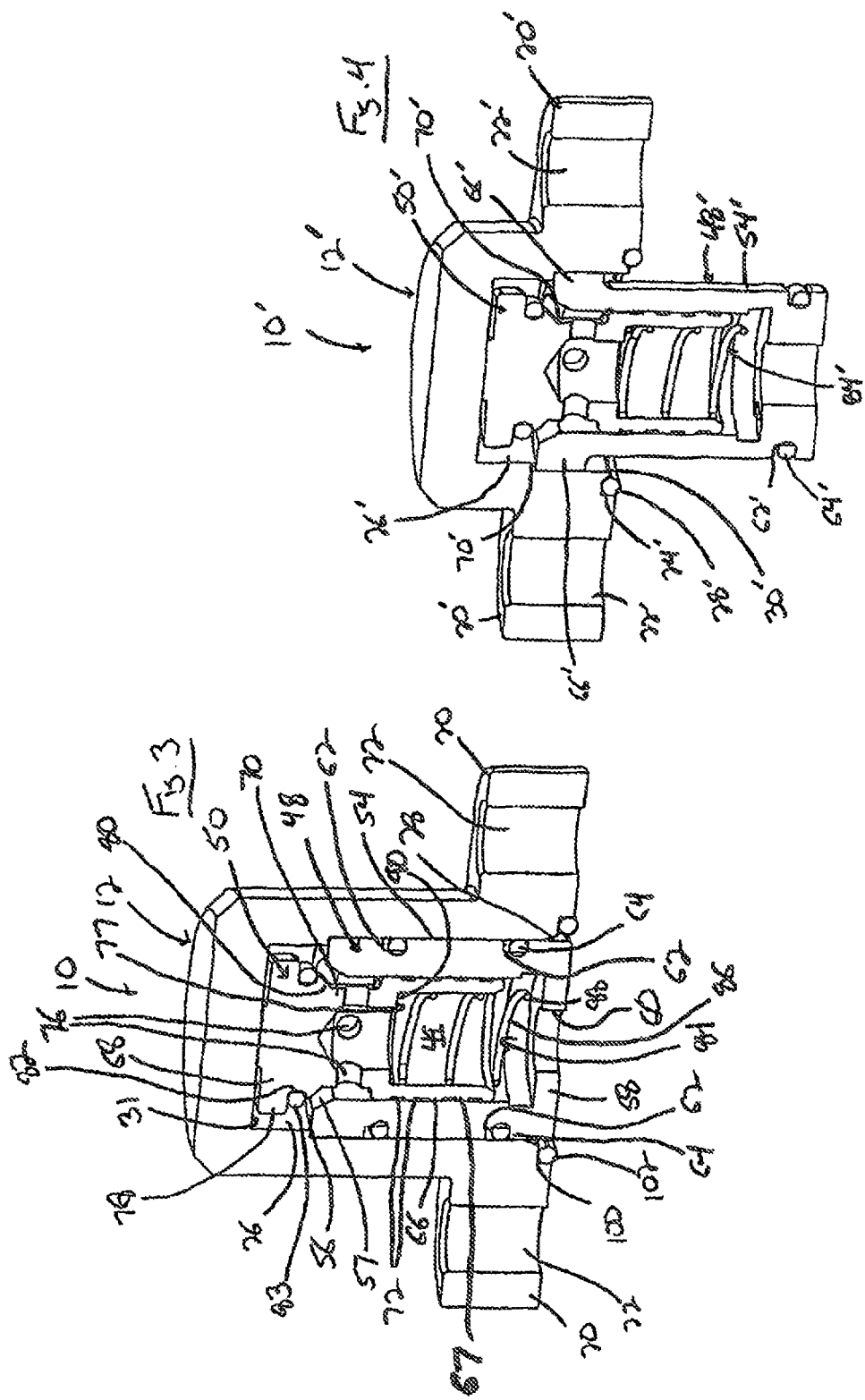

CENTRAL TIRE INFLATION WHEEL ASSEMBLY, VALVE AND CENTRAL TIRE INFLATION SYSTEM

CROSS-REFERENCE TO RELATED APPLICATIONS

This application claims priority from U.S. Provisional Application Ser. No. 61/286,616, filed Dec. 15, 2009, and as a continuation-in-part of U.S. Non-Provisional application Ser. No. 12/568,805, filed on Sep. 29, 2009, now U.S. Pat. No. 8,307,368, issued on Nov. 13, 2012, which claims priority from U.S. Provisional Application Ser. No. 61/100,812, filed on Sep. 29, 2008, the entirety of which are each expressly incorporated by reference herein.

FIELD OF THE INVENTION

The present invention relates to tire inflation valves, and more specifically to a tire inflation valve that forms part of a central tire inflation system of a vehicle.

BACKGROUND OF THE INVENTION

In order to inflate and deflate the tires forming part of the wheels on a vehicle, valves are often located in or on the rims or hubs of the wheels to be used for selectively inflating and deflating the tires disposed around the wheel rims. Air can be directed through the valves either into or out of the tires to increase or decrease the air pressure in the tires, correspondingly altering the ride characteristics of the individual wheel, and the overall vehicle.

On most occasions the valves are only accessible from the exterior of the wheel, such that it is necessary to exit the vehicle to use the valve to inflate or deflate the tire. However, various central tire inflation systems (CTIS) have been developed that provide valves on the wheel rims that can be remotely activated from the cab or other driver compartment for the vehicle. These systems enable an individual to control the flow of air into and out of the vehicle tires using the valves to vary the ride characteristics of the tires as necessary. Examples of systems of this type are illustrated in each of Howald et al. U.S. Pat. No. 6,474,383, Wang et al. U.S. Pat. No. 7,168,468, and co-owned U.S. Pat. No. 7,686,051, each of which are incorporated by reference herein. In each of these patents, the rim of the wheel is formed with internal passages that enable air to be selectively passed from a compressed air supply through the passages to a valve. The valve is selectively operable from within the passenger compartment or cab of the vehicle to enable air to flow through the valve and into the tire through the passages formed in the rim. The passages are formed in either the outer rim (as in the '383 patent) or in the inner rim (as in the '468 patent) and form a flow path from an inlet for the compressed air through the rim and the associated valve to an opening on the exterior surface of the rim component that is located between the opposed sides of the wheel formed by the inner and outer rim sections. This outlet is also located between the beads of a tire mounted to the wheel, such that air exiting the outlet is retained within the tire to increase or decrease the air pressure within the tire, i.e., inflate or deflate the tire as desired.

Nevertheless, these prior art central tire inflation systems utilize passage designs that require the valves utilized therewith to have designs which require a number of additional components for the incorporation of the valves into tires for use with existing central tire inflation systems. These additional components greatly increase the cost and complexity of the valves and the associated CTIS, causing the valves to fail on a regular basis, necessitating that the valves be repaired and/or replaced on a consistent basis.

Additionally, the configuration of the passages in the rim in certain prior art systems requires that the valve be positioned in an abutting relationship with the passages on the exterior surface of the rim component, i.e., be surface-mounted on the rim. This positioning for the valve on the exterior of the rim leaves the valve in an exposed location where the valve can easily be damaged by debris or other objects striking the valve when the vehicle is in operation. In most instances, a wheel cover is required to protect the valve and other ancillary components for the central tire inflation system, such as hoses and fittings. The wheel cover is formed of steel or a composite material, and can trap rocks within the cover when in use, turning the cover into a rock tumbler that enables the rocks to damage the valve and other components of the CTIS system on the wheel that the cover is meant to protect.

As a result, it is desirable to develop a valve for use in a central tire inflation system that includes a minimum of parts and that can be incorporated into a number of different types of wheels. Also, it is desirable to develop a valve that can be positioned within a rim of a wheel incorporating a central tire inflation system that in a recessed or imbedded manner to effectively reduce the profile of the valve on the exterior of the wheel, or that has a minimized profile when positioned on the exterior of the rim, thereby reducing the likelihood of the valve being struck and damaged during operation of the vehicle.

It is also desirable to develop a CTIS that includes not only valves that have an improved configuration and structure, but an internal airflow distribution system that also has an improved structural and operational configuration.

In conjunction with the improved CTIS and distribution system, it is also desirable to provide a control system for operation of the CTIS system that is capable of receiving information from various parts of the vehicle, including during operation of the vehicle, for use in determining the proper operation of the CTIS. This controller can take information provided from various portions of the vehicle and utilized by the CTIS to alter the operational characteristics of the wheels to accommodate for changes in the conditions in which the vehicle is being operated.

SUMMARY OF THE INVENTION

According to one aspect of the present disclosure, a tire valve is provided that can be seated directly on or within a tire wheel and includes a minimum of moving parts to simplify the construction of the valve and to increase the longevity of the valve. The valve includes a casing that is secured to the wheel rim to position the valve on the exterior of the rim or in a position where the valve is located in a recessed position with regard to the rim. The casing encloses a main body that is positioned within the casing in a sealed configuration to prevent air flow between the casing and the main body. The casing also includes an aperture that positions the main body in communication with an air supply used to inflate the tires of a vehicle such that the air supply can direct an air flow through the main body to the tire though an outlet in the casing. To control the air flow from the air supply, the main body includes a valve poppet sealingly, but movably secured therein, that includes a lower portion that is completely held within the main body, and an upper portion that extends outwardly from the main body. The upper portion includes a sealing member that selectively closes off the interior of the main body, to allow air flow from the air supply out of the main body past the valve poppet. The valve poppet is biased into a either an open or a closed position by a biasing member engaged between the valve poppet and the main body. The biasing member assists in enabling the valve poppet to be moved with regard to the main body with only slight changes in air pressure within the main body to allow air flow either to or from the tire. This allows the valve poppet to be operated very quickly and easily, such that control of the operation of the valve can be remotely controlled via a controller connected to the pressurized air source.

According to another aspect of the present disclosure, the valve poppet and biasing member of the valve are designed to be removably and replaceably positioned within either of two versions of the valve. Depending upon the particular application of the valve, i.e., the vehicle on which the valve is to be mounted, the valve poppet and biasing member can be inserted within the main body of the valve for controlling the air flow through the valve to the wheel rim. This design for the valve allows the valve to be quickly repaired or replaced should either of these components of the valve become damaged.

According to still another aspect of the present disclosure, the valve is operably connected to a manifold located on the vehicle that controls the flow of air between the air supply and the valve. The manifold can be operated to control the air flow to specified valves, such as to those valves located on the front wheels and the rear wheels, independently of one another. This control is provided by control valves disposed on the manifold and capable of being selectively operated by the operator of the vehicle to direct the air flow from the air supply to the specified tires, as desired.

According to still a further aspect of the present disclosure, the valve and manifold form part of a central tire inflation system that can be operated through a central controller to operate the manifold and valve. The controller includes a number of manual inputs that can be used to initially configure the system for use of the vehicle in a given environment. Additionally, the controller can be operably connected to sensing devices at various locations of the vehicle to receive information concerning the current operational characteristics of the vehicle, such as when the vehicle is in motion or at rest. This information can subsequently be utilized by the controller to alert the vehicle operator to the changing conditions of the vehicle and/or to automatically alter the configuration of the vehicle using the manifold and valves to accommodate for the changing conditions.

Numerous other aspects, features and advantages of the present disclosure will be made apparent from the following detailed description taken together with the drawing figures.

BRIEF DESCRIPTION OF THE DRAWINGS

The drawings illustrate the best mode currently contemplated of practicing the present invention.

In the drawings:

FIG. 1 is an isometric view of a first embodiment of a wheel valve constructed according to the present invention;

FIG. 2 is an isometric view of a second embodiment of the wheel valve of FIG. 1;

FIG. 3 is a cross-sectional view along line 3-3 of FIG. 1;

FIG. 4 is a cross-sectional view along line 4-4 of FIG. 2;

DETAILED DESCRIPTION OF THE INVENTION

Figure 5:
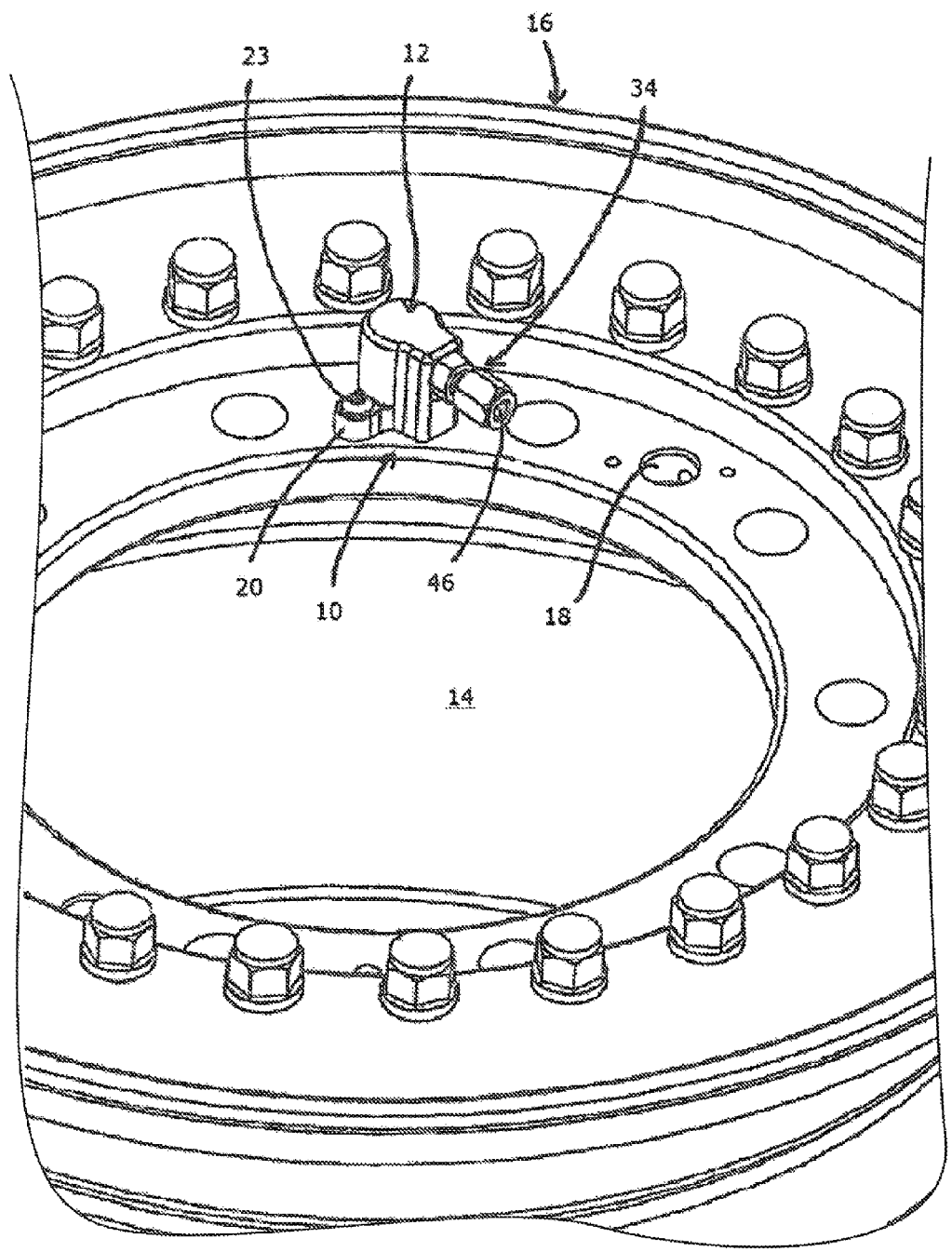
FIG. 5 is an isometric view of the wheel valve of FIG. 1 mounted to a wheel rim.
Figure 6:
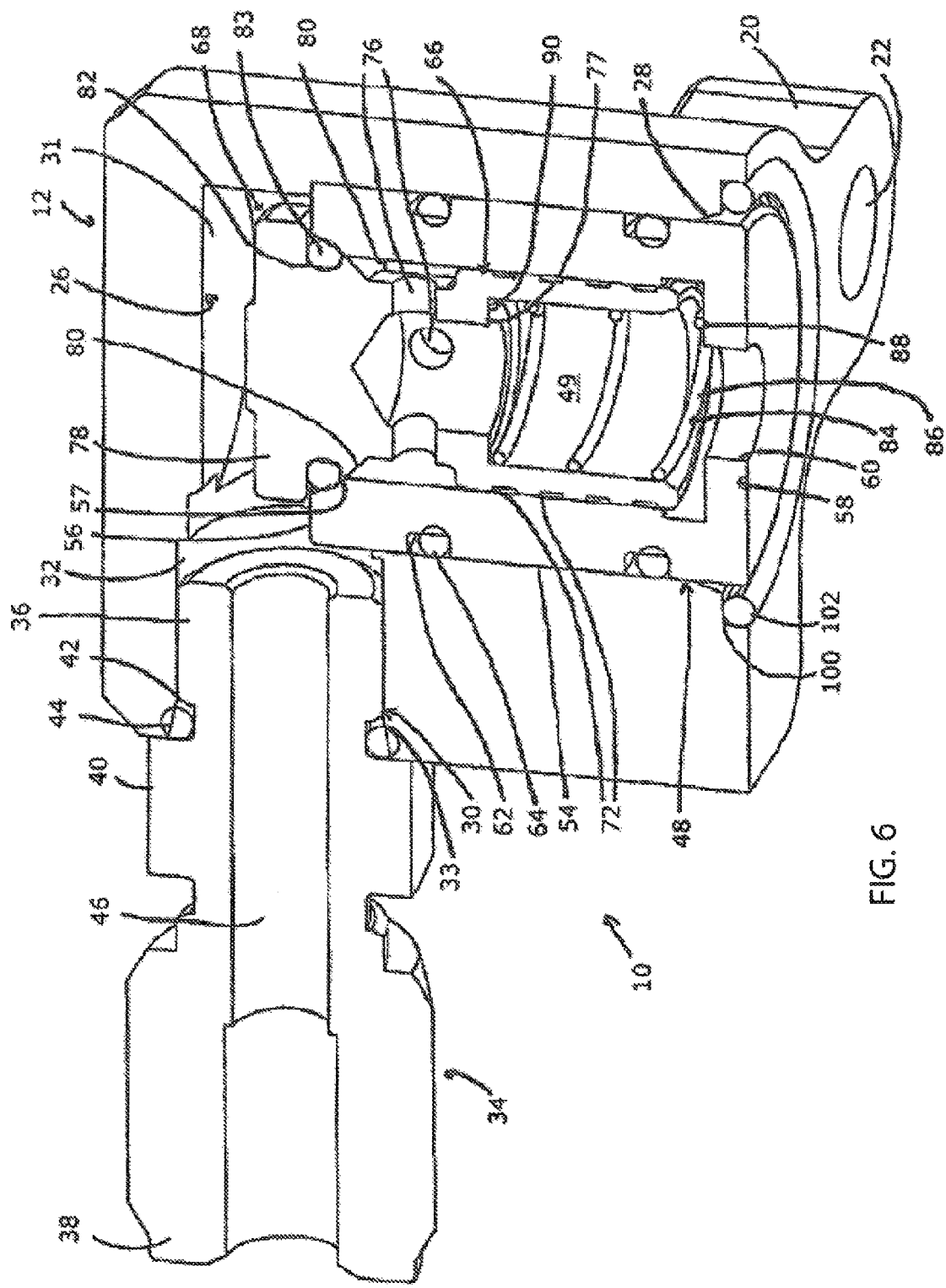
FIG. 6 is a cross-sectional view of the wheel valve of FIG. 1 in a closed position.

With reference now to the drawing figures in which like reference numerals designate like parts throughout the disclosure, a first embodiment of a wheel valve constructed according to the present invention is indicted at 10 in FIGS. 1, 3 and 5-7. The valve 10 includes a casing 12 that is secured to the rim 14 of a wheel 16 adapted to support a tire (not shown) thereon. The rim 14 includes a number of air passages or channels 18 formed therein, with the casing 12 mounted over or otherwise in communication with one of the passages 18. The casing 12 is mounted flush against the rim 14 in any suitable manner to maintain an air-tight engagement between the casing 12 and the rim 14. In a preferred embodiment, the casing 12 includes a pair of flanges 20 extending outwardly from the casing 12 that include bores 22 formed therein. The bores 22 receive suitable fasteners 23 therethrough that are engaged with the rim 14 to affix the casing 12 to the rim 14. In a preferred embodiment, the flanges 20 are integrally formed with the casing 12, but alternatively the flanges 20 can be formed on a ring (not shown) that is releasably engaged with the exterior of the casing 12, such as by the use of suitable threaded engagement structures (not shown) on the ring and the casing 12.

The casing 12 is formed of any suitable material, such as a metal or generally rigid plastic, and includes a central cavity 26 formed therein. The cavity 26 includes an open lower end 28 and an outlet 30 spaced from the lower end 28 adjacent a closed upper end 31. The lower end 28 is adapted to be engaged with a suitable air supply 1002 (FIGS. 15 and 22) that forms part of a central tire inflation system 1000 (FIGS. 15 and 22) including a central controller 500 (FIGS. 15, 21 and 22) connected to the air supply 1002 to direct the air through suitable conduits 1004 (FIGS. 15 and 22) that extend to each of the tires 1006 (FIGS. 15 and 22) of the vehicle, such as along or though the axle of the vehicle. Additionally, the lower end 28 includes a peripheral notch 100 extending radially outwardly from the lower end 28, and in which a sealing member 102 is positioned. When the casing 12 is mounted to the rim 14, the sealing member 102 engages the rim 14 and provides an air-tight engagement between the casing 12 and the rim 14 such that air routed from the air supply passes only into the casing 12.

Spaced from the lower end 28, the outlet 30 can have any desired shape or form, and provides a passage for air flow into or out of the casing 12 to the tire. In a preferred embodiment, the outlet 30 is located generally opposite the lower end 28 and is formed as a circular bore 32 extending through the casing 12 into communication with the central cavity 26. The bore 32 receives a fitting 34 that includes a narrow end 36 positioned and secured within the bore 32 in any suitable manner, such as by a threaded or welded engagement, and a wide end 38 opposite the narrow end 36. The narrow end 36 includes a circumferential flange 40 that serves as a stop for the insertion of the narrow end 36 into the bore 32. Adjacent the flange 40 is disposed a recess 42 in which is positioned a sealing member 44, such as an O-ring, that sealingly engages the interior of the bore 32 or a tapered surface 33 of the bore 32 when the narrow end 36 is received therein to seal the outlet 30. When engaged with the outlet 30, the fitting 34 allows air to flow through a central passage 46 formed therein either from the valve 10, or from the tire, which is connected to the wide end 38 via a tube (not shown) engaged with the wide end 38 in a suitable manner.

Referring now to FIGS. 1, 3, and 5-7, the central cavity 26 of the casing 12 houses a main valve body 48 and a valve member or poppet 50 disposed therein. The main body 48 is formed of any suitable material, such as a metal or rigid plastic, and is formed to conform to the shape of the cavity 26, which is preferably, but not required to be, cylindrical in shape, and which assists in holding the sealing member 102 in the notch 100 for proper engagement with the rim 14. The body 48 includes an outer wall 54 having an open upper end 56 with a tapered inner surface 57, and a radially inwardly extending lower wall 58 that defines an aperture 60 therein that is in fluid communication with the lower open end 28 of the casing 12. The outer wall 54 includes a number of peripheral grooves 62 on its exterior surface in which are disposed sealing members 64, such as O-rings. When the main body 48 is positioned within the central cavity 26 of the casing 12, the sealing members 64 engage the interior of the cavity 26 and provide an air-tight engagement of the main body 48 with the casing 12.

Within the main body 48 is disposed the valve poppet 50, which is formed of a suitable material, such as a metal or a generally rigid plastic, which has a lower section 66 and an upper section 68 joined by a central section 70. The lower section 66 is formed to be complementary in shape or cross-section to the interior 49 of the main body 48 such that the lower section 66 can move or slide within the interior 49 of the main body 48, while also preventing air or fluid flow between the lower section 66 and the main body 48. The sealing engagement of the lower section 66 and the main body 48 can be accomplished using any other suitable means, as are known in the art, which also allow the lower section 66 to move with respect to or slide within the interior 49 of the main body 48. The lower section 66 is also hollow or tubular in configuration such that an air flow can pass completely through the lower section 66. Additionally, the exterior surface 67 of the lower section 66 can be formed with a number of grooves 72 thereon. The grooves 72 lessen the amount of surface of the lower section 66 contacting the main body 48, without compromising the fluid-tight engagement between the lower section 66 and the main body 48. By reducing the area of the lower section 66 contacting the main body 48, when ice forms within or around the valve 10 due to condensation, the reduced amount of contact between the lower section 66 and the main body 48 enables the ice to be broken up more easily, consequently enabling the lower section 66 to slide with respect to the main body 48, so that the valve 10 functions properly, even in cold conditions.

Above and connected to or integrally formed with the lower section 66 is the central section 70. The central section 70 is formed to be narrower in diameter than the lower section 66 to effectively space the central section 70 from the main body 48, and includes a number of air flow apertures 76 formed therein above a stop flange 77 formed within the lower section 66 by the connection of the central section 70 to the lower section 66. The apertures 76 are disposed around the periphery of the central section 70 an enable air flow to pass through the apertures 76 between the outlet 30 and the aperture 60 in the main body 48.

To selectively prevent air flow through the apertures 76, the upper section 68 is connected to or integrally formed with the central section 70 opposite the lower section 66, and formed with a diameter greater than the diameter of the lower section 66 and the interior 49 of the main body 48, such that the upper section 68 can selectively engage the open upper end 56 of the main body 48. To accomplish this function, in a preferred embodiment, the upper section 68 includes a cylindrical top 78 and a conical part 80 extending downwardly from the top 78. The conical part 80 is shaped to function as a guide for the valve poppet 50 by engaging the tapered inner surface 57 of the upper end 56 of the main body 48 to align the valve poppet 50 within the main body 48. In addition, the conical part 80 is separated from the top 78 by a peripheral groove 82 within which is positioned a sealing member 83, such as an O-ring. The groove 82 and sealing member 83 are located adjacent the top 78, such that the sealing member 83 engages the tapered surface 57 when the valve poppet 50 is in the closed position, best shown in FIG. 6. In this position, the engagement of the sealing member 83 with the surface 57 prevents any air flow through the apertures 76 and lower section 66 between the outlet 30 and the lower open end 28 of the casing 12. However, when the sealing member 83 is moved away from the surface 57 by the axial movement of the poppet 50 with respect to the main body 48, air flow is permitted through the valve poppet 50, via the apertures 76 and hollow lower section 66, between outlet 30 and the aperture 60/open lower end 28.

Figure 7:
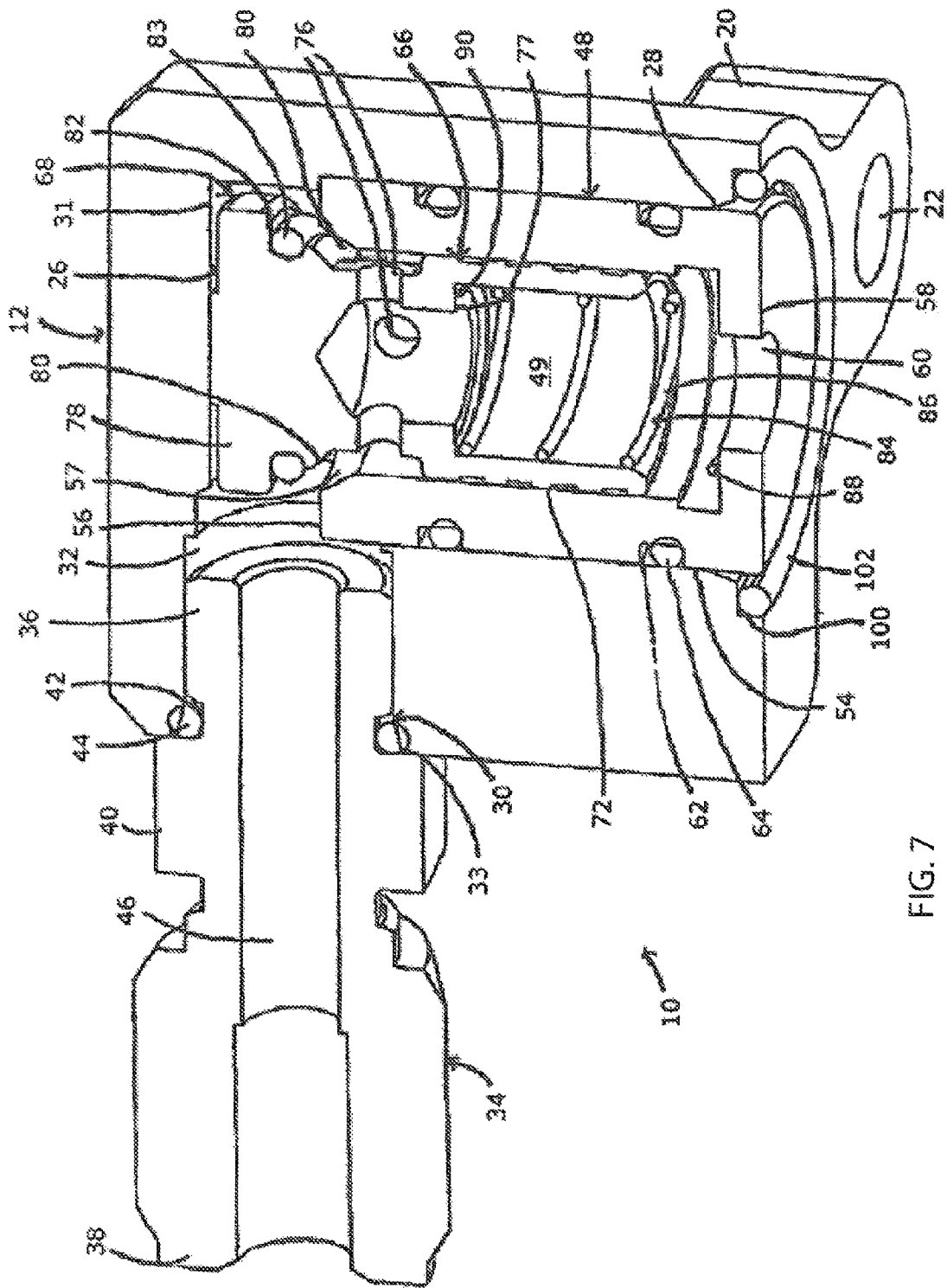
FIG. 7 is a cross-sectional view of the wheel valve of FIG. 1 in an open position.
Figure 8:
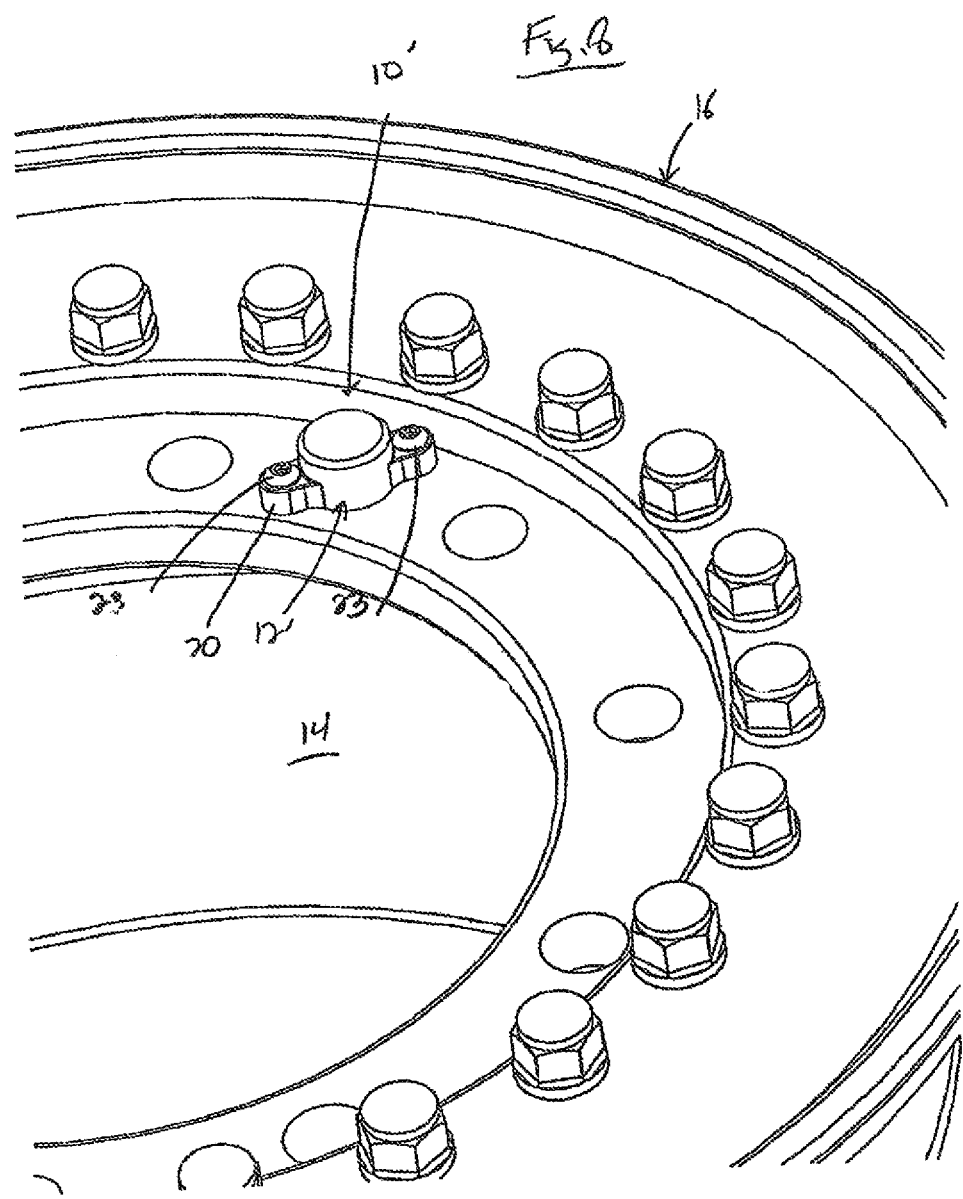
FIG. 8 is a partially broken away, isometric view of the wheel valve of FIG. 2 mounted to a wheel rim.

To control, in part, the movement of the valve poppet 50 within the main body 48, a biasing member 84 is disposed within the main body 48. The biasing member 84, which is preferably a spring 86, has a first end 88 that engages the lower wall 58 of the main body 48 around the aperture 60, and a second end 90 that extends into the lower section 66 of the valve poppet 50 and engages the stop flange 77 formed by the central section 70. Thus, the biasing member 84 provides a biasing force on the central section 70 of the valve poppet 50 that urges the valve poppet 50 away from the lower wall 58, thereby unseating the conical part 80 and sealing member 83 from the tapered surface 57 on the main body 48. Thus, the biasing member 84 urges the valve poppet 50 into the open position as shown in FIG. 7.

To prevent the flow of air through the valve 10 and oppose the bias of the biasing member 84, the force exerted by the biasing member 84 is selected to be less than the force exerted by the normal operating range of pressure of the air in the tire 1006 to which the valve 10 is connected. In this manner, while the biasing member 84 is urging the valve poppet 50 away from the surface 57 on the main body 48, the force of the air pressure from the tire acts on the poppet 50 through the outlet 30 in opposition to the biasing member 84 to urge the poppet 50 into engagement with the main body 48. Thus, because during normal operation of the vehicle and tire 1006, the force of the air pressure within the tire is greater than the force exerted by the biasing member 84, the air pressure overcomes the biasing member 84 and maintains the poppet 50 in the closed position shown in FIG. 6.

To operate the valve 10, the operator of the vehicle through a suitable controller 500 (FIG. 21) causes air from the air supply 1002 to be directed into the valve 10 through the aperture 60 in the lower wall 58 of the main body 48. When the pressure exerted by this air flow from the air supply 1002 and the biasing force of the biasing member 84 exceeds that of the air pressure exerted from the tire 1006, the poppet 50 moves towards the upper end 31 of the casing 12 and away from the main body 48 to allow air flow between the tire and the air supply. Further, because the poppet 50 is moved away from the main body 48 due the combined forces of the air flow from the air supply and the biasing member 84, the air flow needed to move the poppet 50 can be less than that of the air pressure in the tire. As a result, the valve 10 can be operated to inflate or deflate the tire, by allowing air flow into or out of the tire depending on the pressure differential between the tire air pressure and the pressure of the air flow used to operate the valve 10. In a preferred embodiment, the air pressure needed to move the poppet 50 and operate the valve 10 is between one (1) pound per square inch (psi) and one hundred and forty-five (145) psi. Further, if the pressure of the air from the supply 1002 used to operate the valve is greater than the pressure of the air in the tire 1006, the air flow will proceed through the valve 10 and into the tire to inflate the tire. Conversely, if the pressure of the air from the supply 1002 used to operate the valve is less than the pressure of the air in the tire 1006, the air flow will proceed out of the tire through the valve 10 to deflate the tire 1006.

Figure 9:
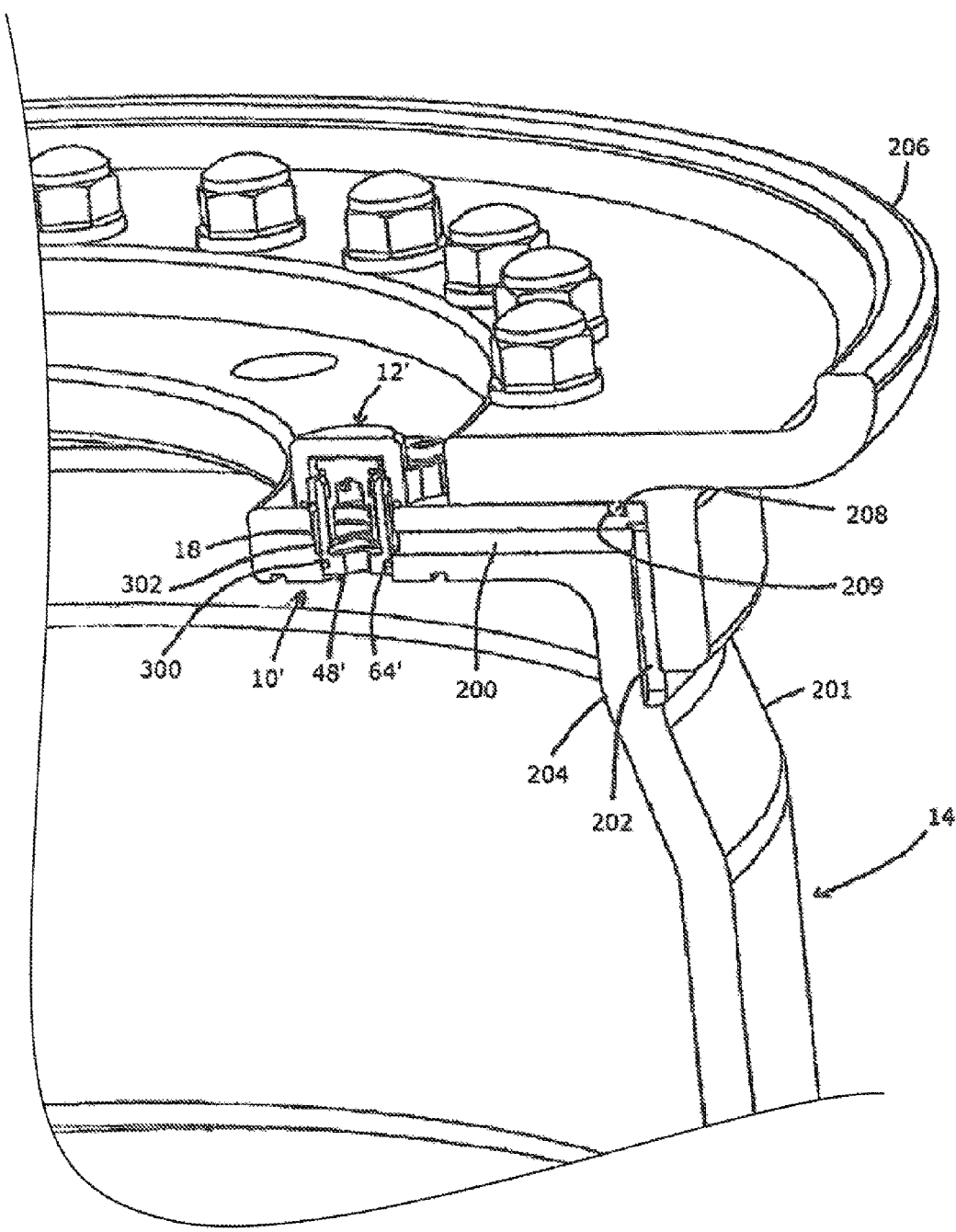
FIG. 9 is a cross-sectional view of the wheel valve of FIG. 2 mounted to a wheel rim.

Looking now at FIGS. 2, 4, and 8-11, a second embodiment of the valve 10' is illustrated. In this embodiment, the valve 10', instead of being mounted flush with the rim 14, as for valve 10, is mounted within the passage 18, such that the valve 10' is recessed within the rim 14 to lessen exposed portion of the valve 10' relative to the valve 10, and consequently reduce the potential for objects striking and damaging the valve 10'. The passage 18 is formed within a rim 14 having an inner rim 201 and is connected to an air channel 200 formed in the inner rim 201 in any suitable manner, such as by drilling, though the rim 14 to the passage 18, and channel 200 could also he formed in the outer rim 206, or between the outer rim 206 and the inner rim 201, if necessary. The channel 200 terminates in a groove 202 formed in a peripheral wall 204 of the inner rim 201, and that preferably extends radially inwardly from the channel 200 towards the center of the peripheral wall 204 of the inner rim 201. When an outer rim 206 is affixed to the inner rim 201, as best shown in FIG. 9, the outer rim 206 is positioned over the air channel 200 and a portion of the groove 202 to define an air flow path between the passage 18 and the exterior of the peripheral wall 204, over which the tire is positioned, thereby creating a path for introducing and removing air from the interior of the tire. Air is prevented from passing from the tire between the inner rim 201 and the outer rim 206 due to a sealing member 208 disposed in a circumferential groove 209 positioned on one of the inner rim 201 or the outer rim 206 and located between the inner rim 201 and the outer rim 206.

Alternatively, the shape and direction of the groove 202 can be varied as desired, so long as the end of the groove 202 opposite the channel 200 is not completely obscured by the outer rim 206. Additionally, the groove 202 can be omitted entirely, and the channel 200 can be formed to extend from the passage 18 to a point on the peripheral wall 204 below the outer rim 206 when the outer rim 206 is secured to the inner rim 201. Also, the outer rim 206 can be formed in a manner that allows communication between the channel 200 and the tire when the wheel assembled, such as by forming the groove 202 in the outer rim 206. Further, the inner rim 201 and the outer rim 206 can be formed as a single piece rim (not shown), eliminating the need for securing the sections to one another.

In the valve 10', the casing 12' is formed similarly to the casing 12 of the previous embodiment, but has reduced in size to compensate for the reduced portion of the valve 10' located above the exterior surface of the rim 14. The casing 12' includes flanges 20' with bores 22' used to secure the casing 12' to the rim 14, and a central cavity 26' formed therein. However, unlike the casing 12, the casing 12' only has an open lower end 30', and does not include any other opening or aperture in the casing 12'. A notch 24' is formed around the open lower end 30' and includes a sealing member 28' therein that sealingly engages the rim 14 when the casing 12' is secured thereto to provide an air tight engagement between the casing 12' and the rim 14.

The cavity 26' receives portion of a main body 48' and a valve poppet 50' located partially within the main body 48', as well as a biasing member 84' engaged between the poppet 50' and the main body 48'. The valve poppet 50' and biasing member 84' are formed identically to the poppet 50 and biasing member 84 in the previous embodiment, such that the components are interchangeable, and thus the structure and operation of the poppet 50' and biasing member 84' will not be discussed in any further detail.

Referring now to FIGS. 8-11, the main body 48' is formed of any suitable material, such as a metal or hard plastic, and is formed to generally conform to the shape of the cavity 26', which is preferably cylindrical in shape, but that can be formed with any suitable cross-section. The body 48' includes an outer wall 54' having an open upper end 56' with a tapered inner surface 57', and a radially inwardly extending lower wall 58' that defines an aperture 60' therein. However, the outer wall 54' conforms in diameter only to a reduced diameter lower portion 300 of the passage 18 (FIG. 9), with the remainder of the outer wall 54' having a diameter less than that of the passage 18 to form a space 302 therebetween. The space 302 is in communication with the channel 200, such that air may flow freely between the channel 200 and the space 302.

The outer wall 54' includes a peripheral groove 62' on its exterior surface adjacent the lower wall 58' in which is disposed a sealing member 64', such as an O-ring. As best shown in FIG. 9, when the main body 48' is positioned within the passage 18, the sealing member 64' engages the interior of the reduced diameter portion 300 of the passage 18 and provides an air-tight engagement of the lower end of the main body 48' with the passage 18 in the rim 14.

Figure 10:
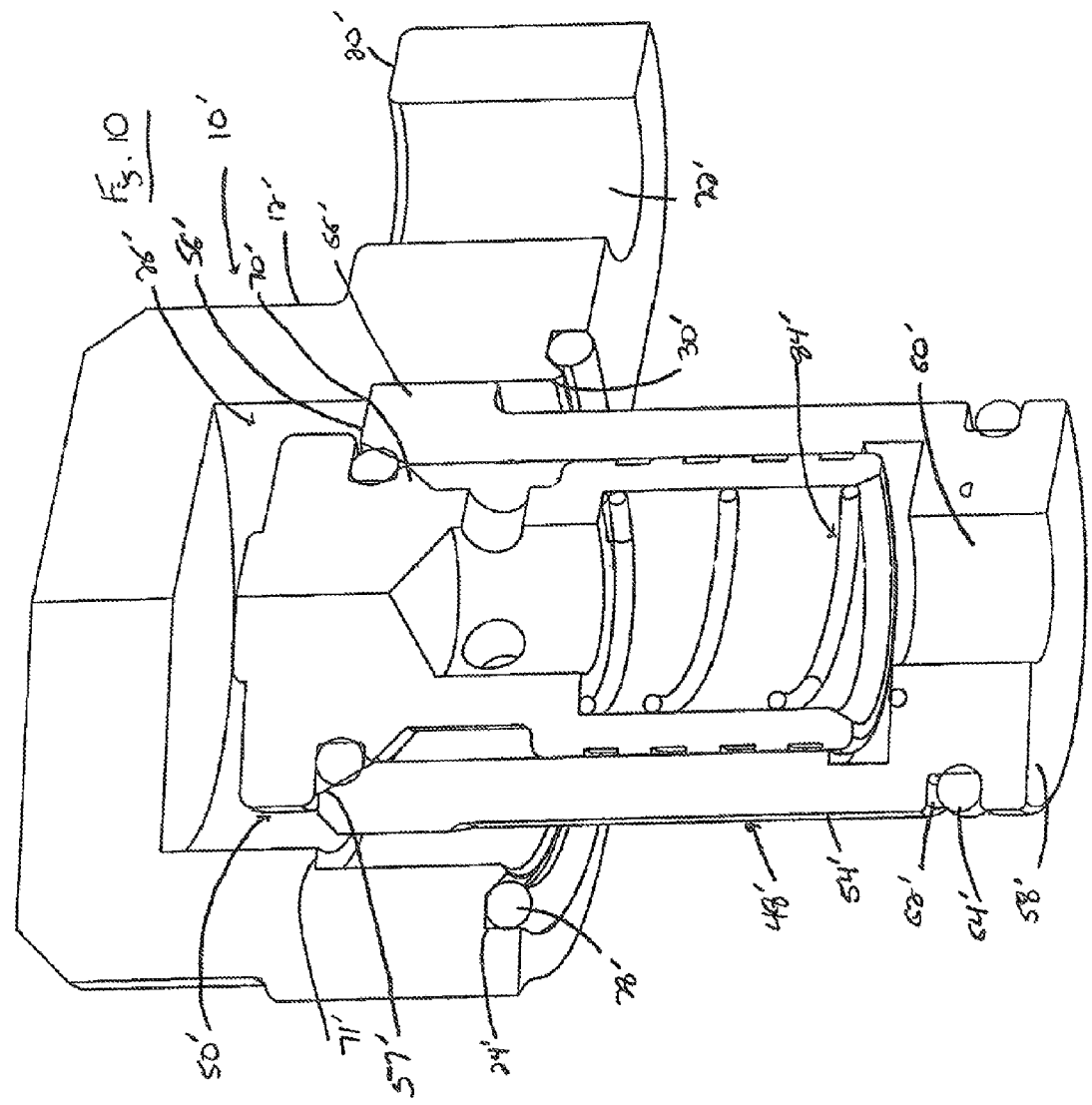
FIG. 10 is an angled cross-sectional view of the wheel valve of FIG. 2 in a closed position.

At the upper end 56', the outer wall 54' includes a number of radially outwardly extending tabs 66' that are spaced from one another around the periphery of the main body 48', best shown in FIG. 10. The tabs 66' define a number of spaces 68' therebetween and are used to properly position the body 48' within the casing 12'. When the valve 10' is mounted to the rim 14, the main body 48' is inserted into the casing 12' and the tabs 66' are engaged by the interior wall of the cavity 26' and an annular shoulder 70' disposed within the cavity 26' of the casing 12'. This engagement serves to properly locate the tabs 66' and thus the main body 48' within the cavity 26', the sealing member 64' in sealing engagement with the passage 18, and the casing 12' flush against the rim 14.

When the casing 12' is affixed to the rim 14, air flow from the air supply is directed into the valve 10' through the aperture 60' in the lower wall 58' of the main body 48' from a suitable air supply 1002 for the CTIS 1000. The engagement of the sealing member 64' between the passage 18 and the main body 48' prevents any air from passing between these components and into or out of the space 302 surrounding the main body 48' within the passage 18.

Figure 11:
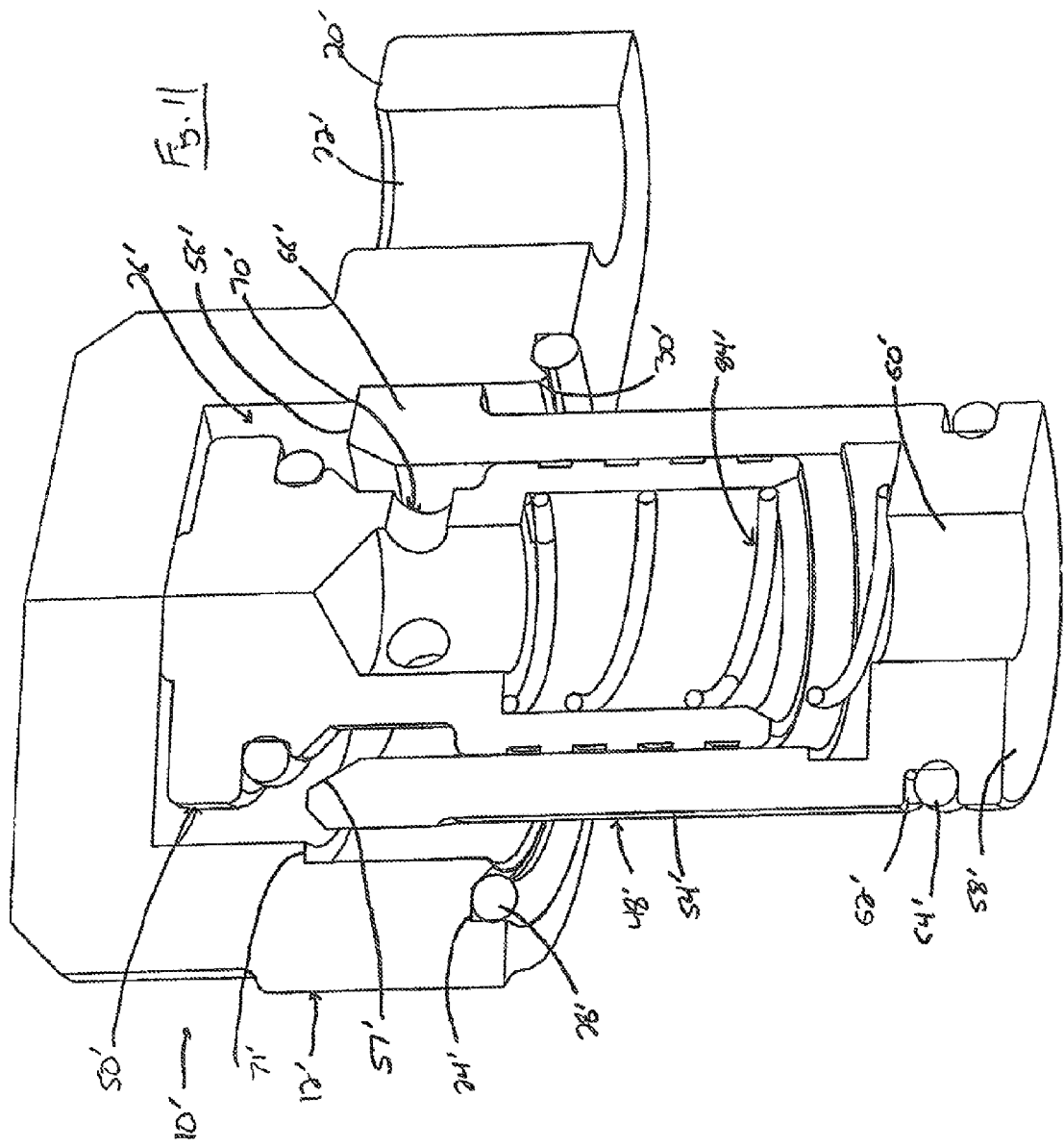
FIG. 11 is an angled cross-sectional view of the wheel valve of FIG. 2 in an open position.
Figure 12:
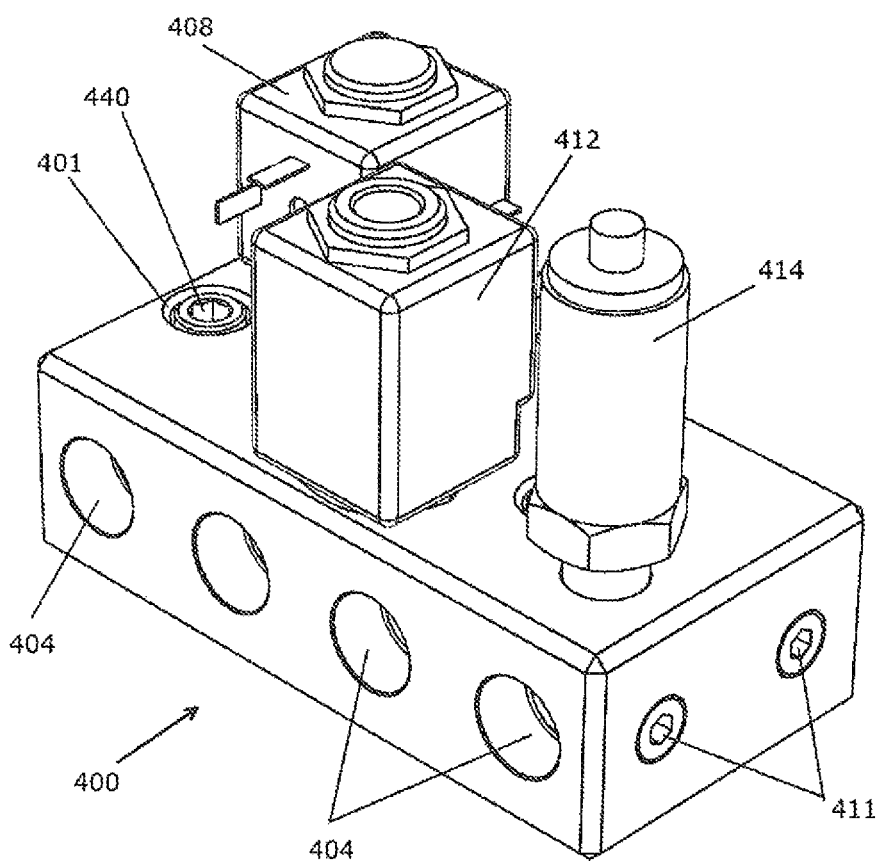
FIG. 12 is an isometric view of a first embodiment of a manifold used to control the valve of FIG. 1 in a central tire inflation system.
Figure 13:
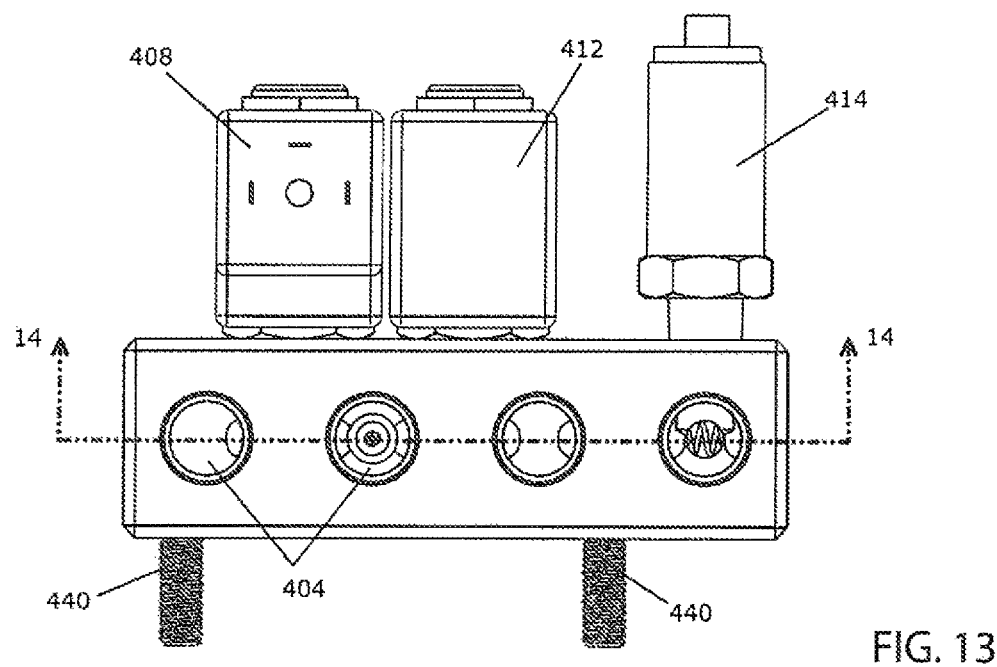
FIG. 13 is a front plan view of the manifold of FIG. 12.
Figure 14:
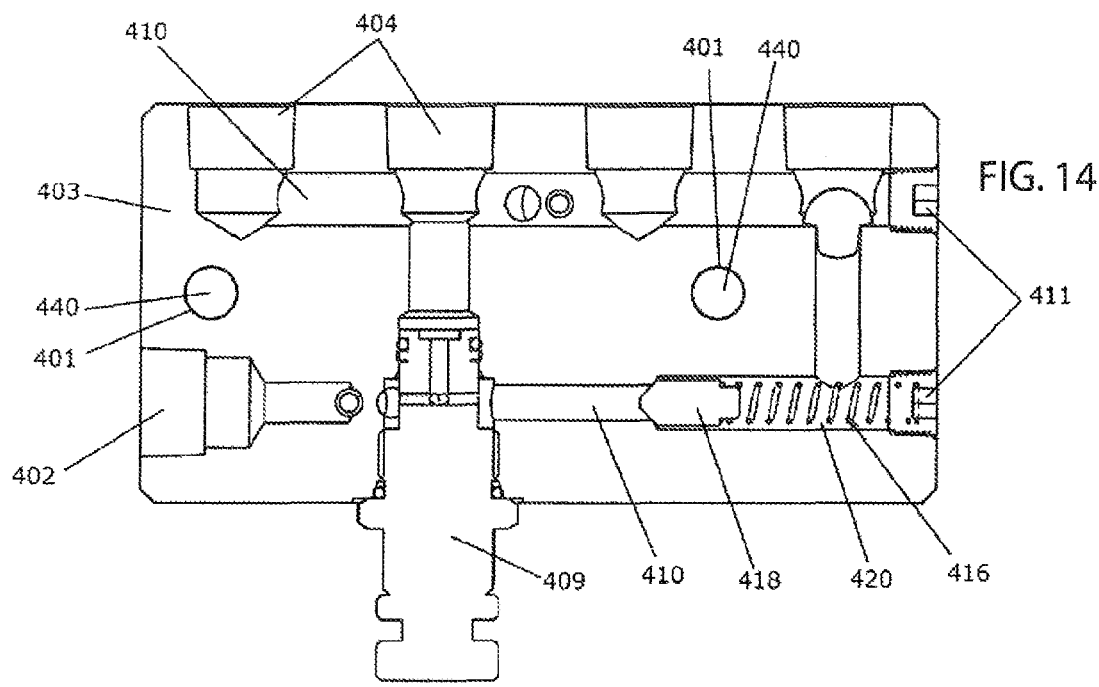
FIG. 14 is a cross-sectional view along line 14-14 of FIG. 13.

Because air can flow freely between the channel 200 and the space 302, the air pressure from the tire 1006 is exerted on the poppet 50' along the channel 200, through the space 302 and onto the poppet 50' via the channels or spaces 68' defined between the tabs 66' on the main body 48'. In this manner, the air pressure within the tire operates to close the valve 10 in the same manner as in the previous embodiment for the valve 10. In addition, when a pressurized air flow is introduced into the main body 48' from the air supply 1002 through the aperture 60', the poppet 50' is urged away from the main body 48', as shown in FIGS. 9 and 11, allowing air to flow into or out of the space 302 and consequently the tire 1006, via the apertures 76' in the central section 70 of the poppet 50', which results in the inflation or deflation of the tire.

To further refine the control of the operation of the valves 10 or 10', the central tire inflation system 1000 can incorporate a manifold 400, shown in FIGS. 12-20. In a first embodiment for the manifold 400 shown in FIGS. 12-15, the manifold 400 is positioned on the vehicle (not shown) between the valve(s) 10 and the air supply or compressor 1002 (FIG. 15) and can be secured to the vehicle using suitable fasteners 440 inserted through mounting bores 401 in the manifold 400 and secured to the vehicle where desired. The manifold 400 is formed from a block 403 of a suitable material, and includes an air inlet port 402, a number of air outlet ports 404, and a pressure relief port 406. The inlet port 402 is connected to the air supply 1002 using a suitable conduit 1004 such that air coming from the air supply 1002 is directed into the manifold 400 via the inlet port 402.

Once in the manifold 400, the air is directed into a three way solenoid inflation valve 408 that can be controlled by the operator of the vehicle to release selected amounts of air into the remainder of the manifold 400, or to prevent the passage of any air into the manifold 400.

If the valve 408 is opened, the air flows through the valve 408 and through a pressure compensated flow control device 409 that, during a deflation mode for the system 1000, could maintain the velocity of the fluid flow the exhaust the tires 1006 in a timely manner into supply tubes 410 formed in the block 403 and closed by plugs 411. The air in the supply tubes 410 is directed towards each of the outlet ports 404 to supply air to the tires 1006 through the valves 10, 10' connected between each of the ports 404 and the tires 1006. The supply tubes 410 also includes a solenoid dump valve 412 connected thereto, to control the air flow into the respective outlet ports 404. Additionally, a pressure transducer 414 is connected to the supply tube 410 to monitor the pressure of the air flow in the manifold 400 and provide this information to the vehicle operator. Also, the tube 410 includes a check valve 416 disposed therein adjacent the device 409, formed by a cone 418 biased into engagement with a reduced diameter section of the tubes 410 by a biasing member 420 disposed between the cone 418 and a plug 411 to control the flow of air within the tubes 410.

Figure 15:
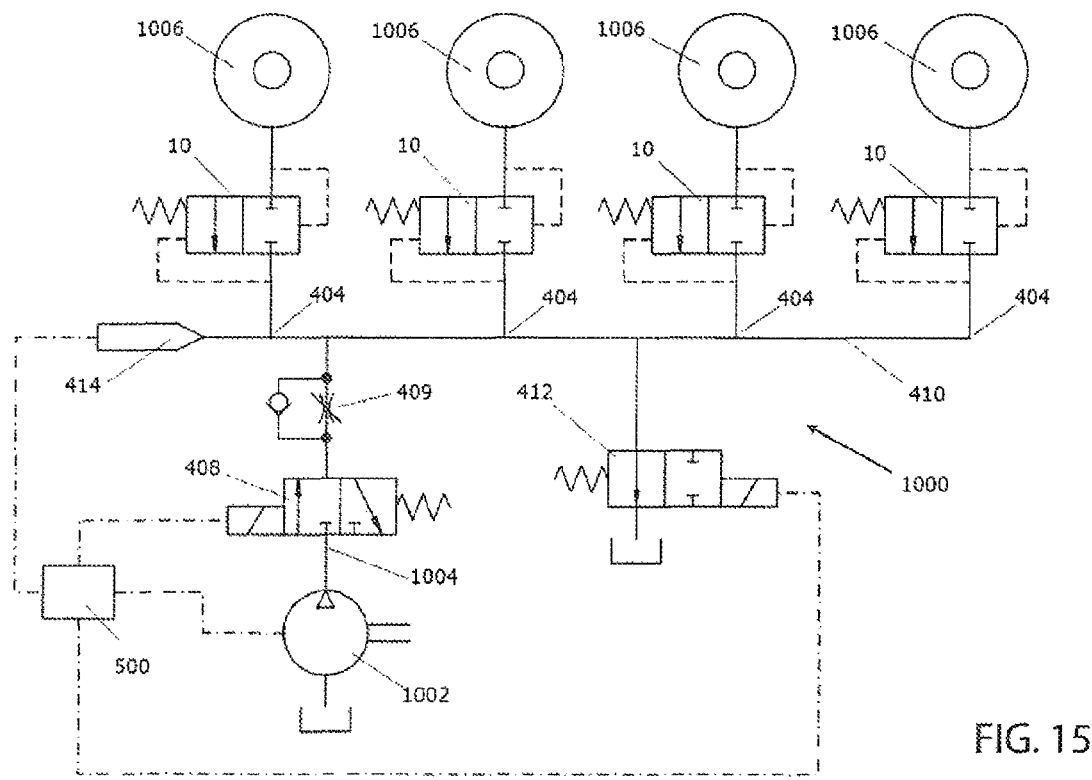
FIG. 15 is a schematic view of the central tire inflation system including the manifold of FIG. 12.
Figure 16:
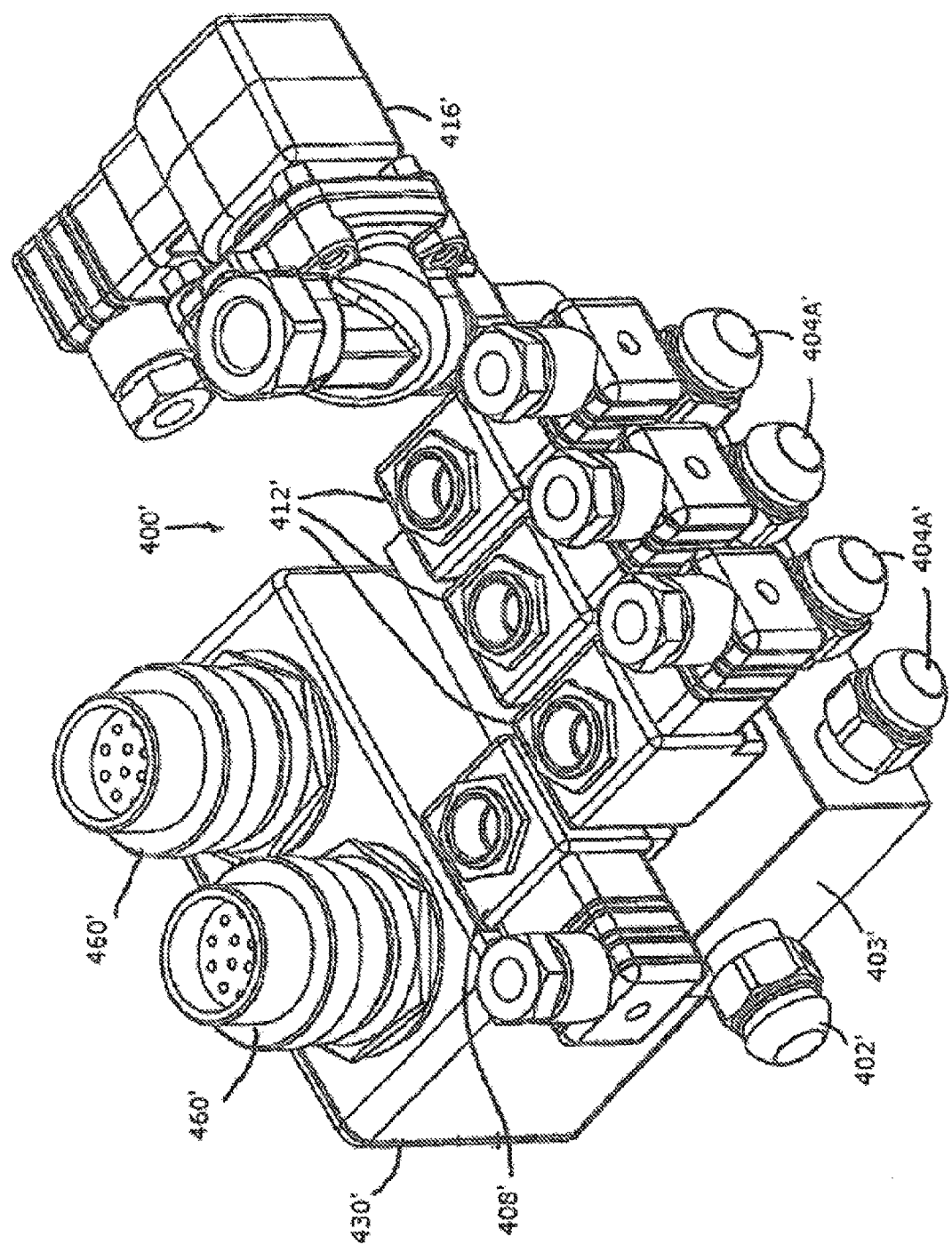
FIG. 16 is an isometric view of a second embodiment of a manifold used to control the valve of FIG. 1 in a central tire inflation system.
Figure 17:
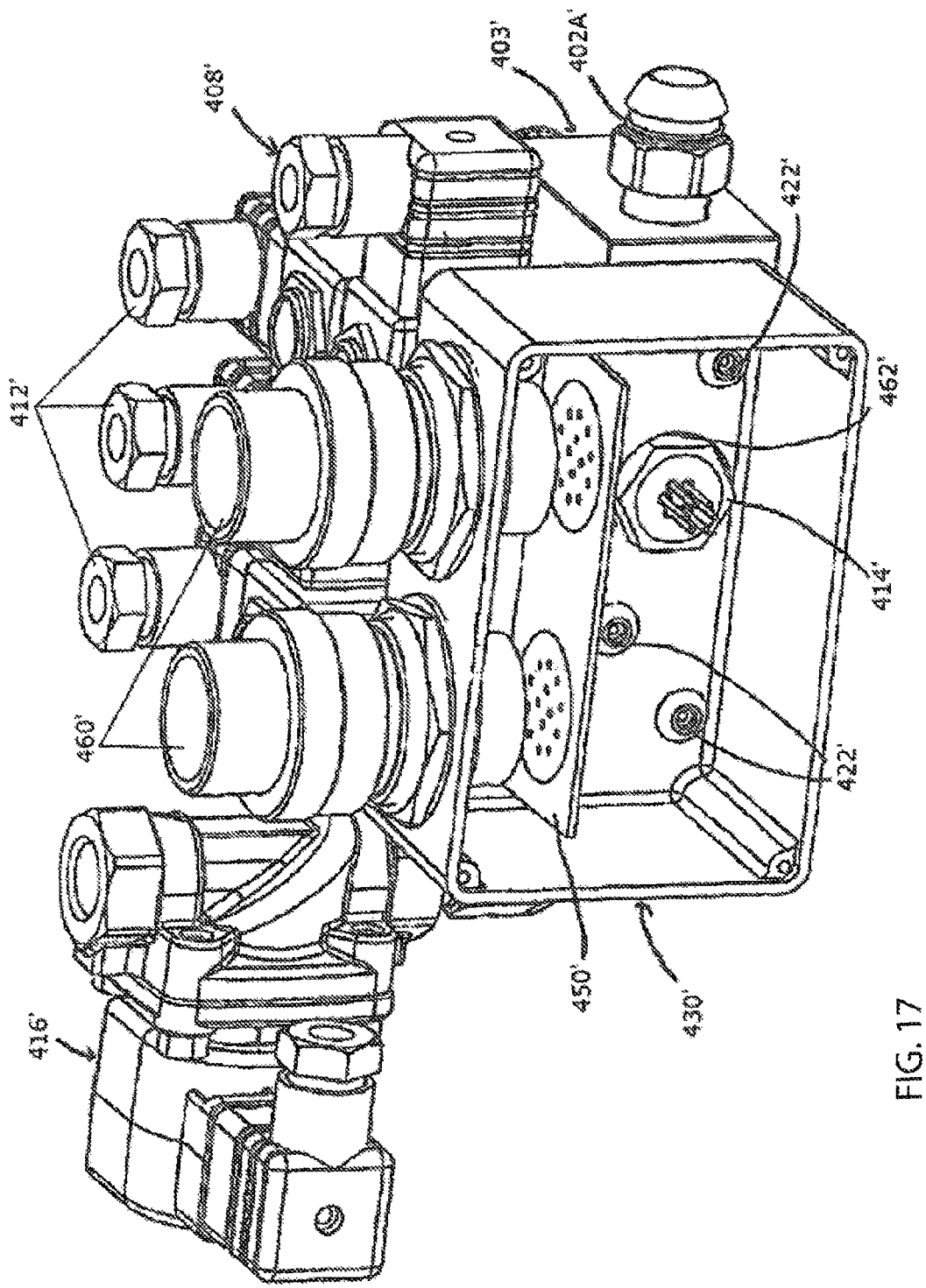
FIG. 17 is a rear isometric view of the manifold of FIG. 16.
Figure 18:
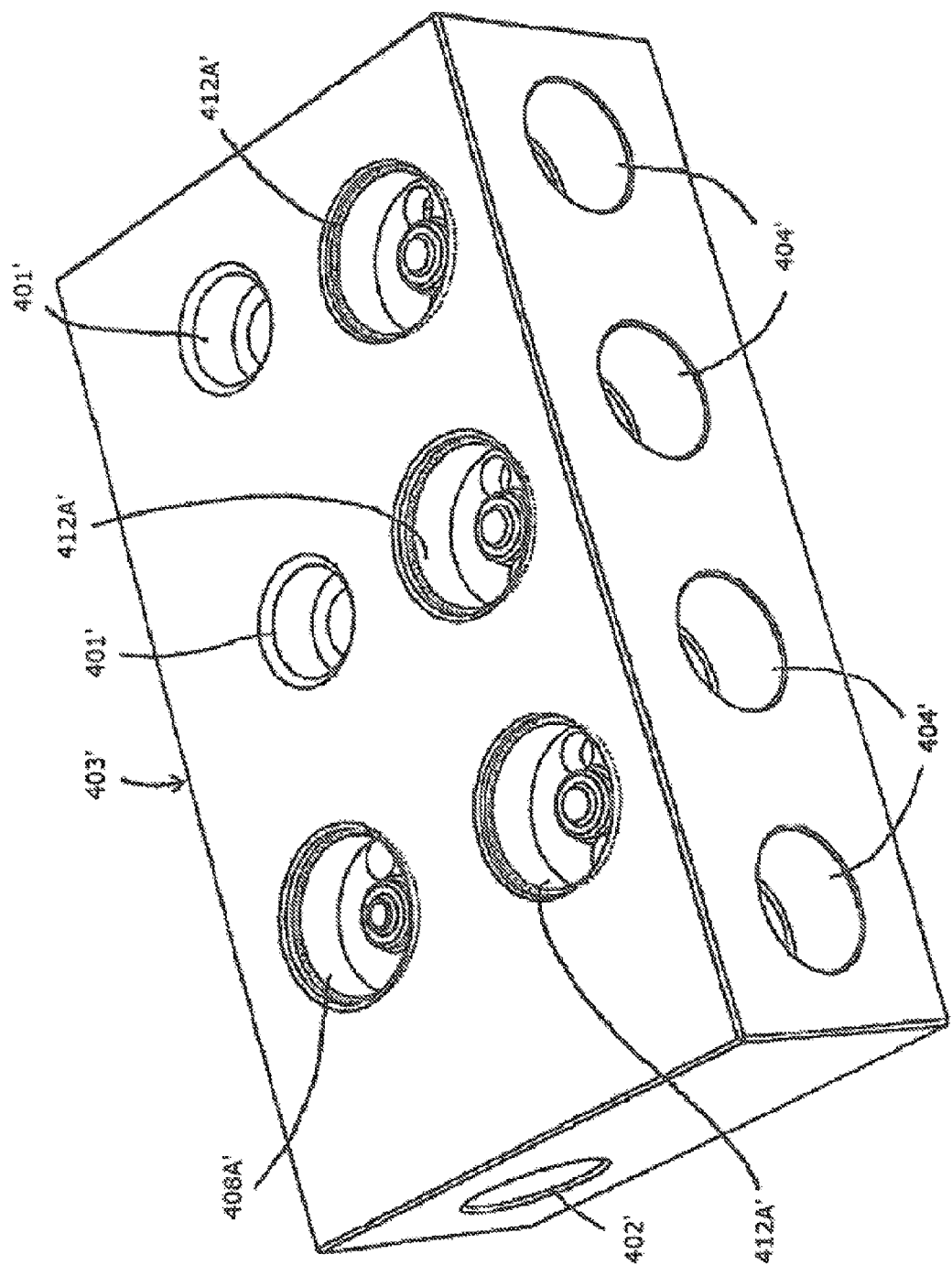
FIG. 18 is an isometric view of a manifold block of the manifold of FIG. 17.
Figure 19:
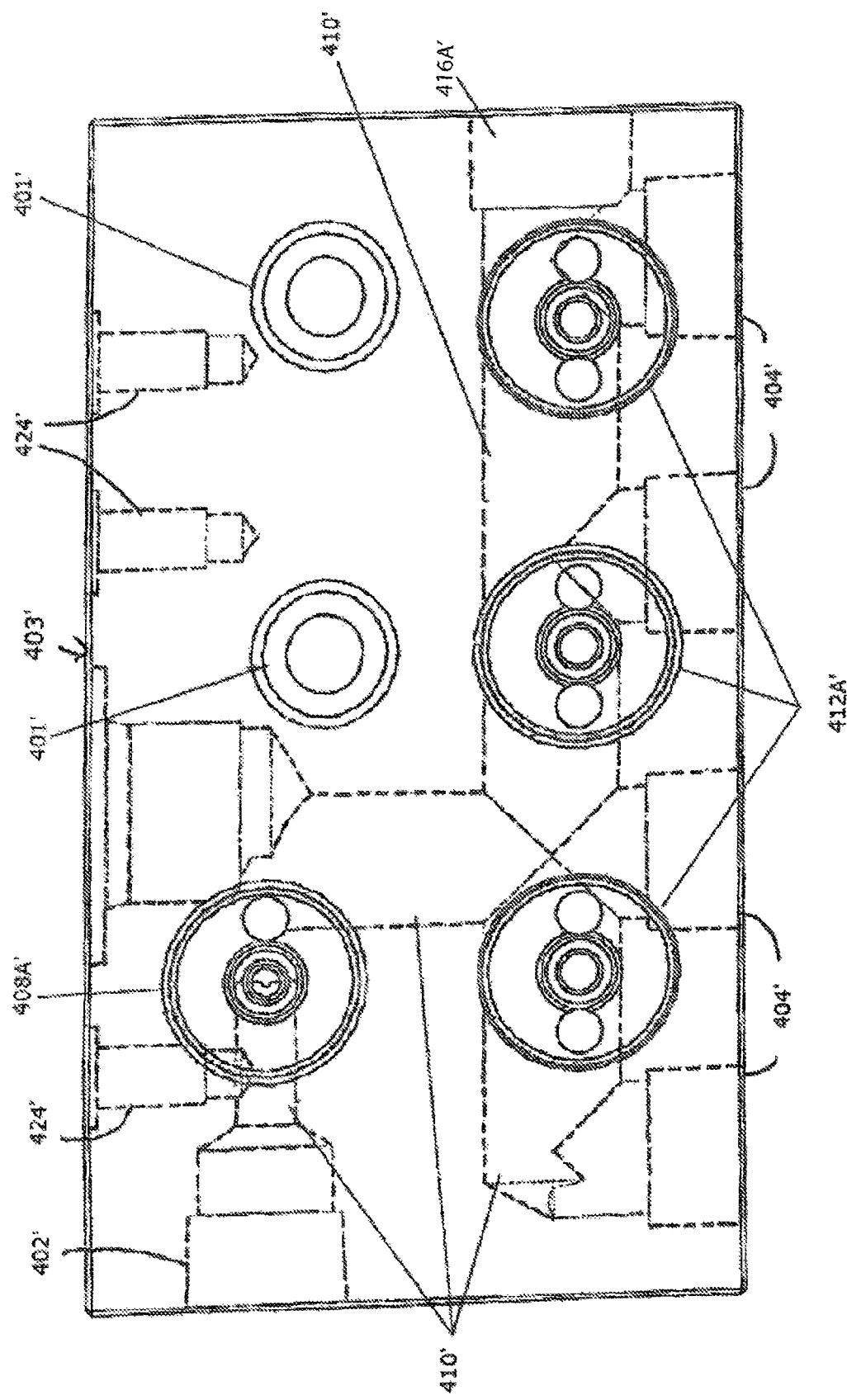
FIG. 19 is a top plan view of the manifold block of FIG. 18.
Figure 20:
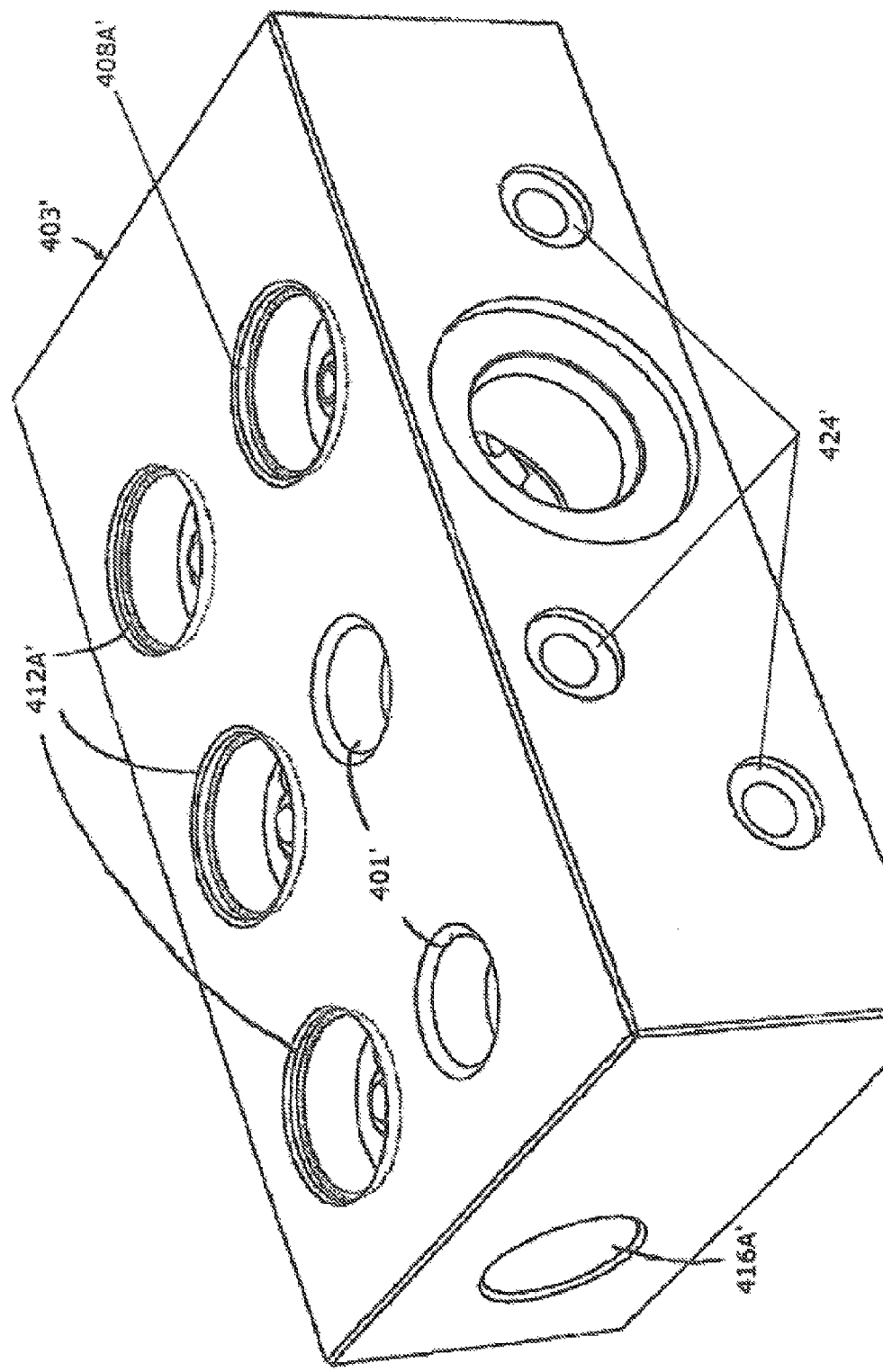
FIG. 20 is a rear isometric view of the manifold block of FIG. 18.

By using the manifold 400, it is possible to control the pressurization or depressurization of multiple tires on a vehicle in a closely controllable manner by employing a controller 500 that is operably connected to the valves 408, 412, the flow control device 409, the pressure transducer 414, the air/fluid supply 1002 and optionally to the valves 10, 10' (FIG. 15). Also, for vehicles that require pressure differentials between various tires 1006 on the vehicle, such as on a four wheel drive vehicle, and/or a vehicle pulling trailer, additional manifolds (not shown) can be located within the vehicle and connected to the air supply 1002 and the respective tires 1006 to control the air pressure within each of those tires independently of the other tires on the vehicle.

Looking now at FIGS. 16-20, a second embodiment of the manifold 400' for use in the system 1000 is shown. The manifold 400' is formed similarly to the manifold 400 and has a block 403' with mounting bores 401', that also includes an inlet port 402' with fitting 402A' connectable via conduits 1004 to the fluid supply 1002 and a number of outlet ports 404' with fittings 404A' connectable via conduits 1004 to each of the tires 1006. The block 403' is also connected to an electrical box 430' via fasteners 422' engaged within bores 424' in the block 403' that houses a printed circuit board 450'. This manifold 400' is a closed loop system, similar to the manifold 400, with a static pressure check versus a dynamic pressure check. The manifold 400' can be activated with an adjustment cycle which gives power to 3-5 solenoid valves 408' and 412' per manifold 400' creating a pressurized closed loop system to provide accuracy of ±0.25 psi between all tires 1006 connected to the manifold 400' during static pressure checks.

Connected to the manifold 400' are an inflation valve 408' in a port 408A', which is a 2-way 2-position NC, a number of deflation valves 412' in ports 412A', which are 2-way 2-position NO, and an exhaust or dump valve 416' in port 416A', which is a 2-way 2-position NO. The inflation valve 408' is operable to pass air or fluid from the fluid supply 1002 through the passages 410' within the block 403' from the inlet 402' to the outlets 404' to inflate the tires 1006. The system 1000 can be programmed to shut the inflation valve 408' off, pausing the inflation cycle while maintaining a closed loop pressurized system. During this short pause the system 1000 can equalize pressure in all tires 1006 and take a static pressure reading to verify the system pressure with the programmed pressure requirement.

The deflation valves 412' replace the pressure compensated flow controller 410 of the first embodiment to deflate the tires 1006. The size and the number of tires 1006 each manifold 400' has to control will determine the number of valves 412' connected to the manifold 400'. In operation, the valves 412' are opened one at a time in a manner of regulating the flow of air deflating from the tires 1006 through the wheel valves 10, 10' and through the solenoid valve 412'. At higher pressures, only one valve 412' is opened at a time because the deflation flow volume allows the wheel valves 10, 10' to stay open without prematurely snapping shut. However, another deflate solenoid valve 412' can be energized to come on line or open once the flow volume is decreased to a level where an increase in the deflation flow volume can be accommodated without that signal reaching the wheel valve 10, 10' to trigger the shutting off of the wheel valves 10, 10' to shutting prematurely before the pressure adjustment was completed.

The additional solenoid valve 416' secured to the manifold 400' for use as an exhaust or dump valve sends a pressure signal, via the fluid, to the wheel valve 10, 10' great enough to shut the wheel valve 10, 10' from the biased side tire pressure. Once the programmed pressure has been met, the system 1000 will take power away from all valves 408' opening up the closed loop system to atmospheric pressure sending a substantial pressure drop signal to the individual wheel valves 10, 10' to snap shut due to the remaining pressure on the bias side of the wheel valve, i.e., the tire pressure.

More specifically, by utilizing the valves 412', the manifold 400' can operate a in a stepped deflation system, which refers to deflation speed of the tires 1006. Basically, when the deflation valve 412' is opened to deflate a tire 1006, the higher pressure within the tire 1006 will cause a higher volume of air to exit the tire 1006. However, as the pressure within the tire 1006 decreases, the air volume exiting the tire 1006 slows down and the retract rate of the valves 10, 10' is reduced. At this point, the second deflation valve 412' is opened, creating an additional exit path for the air from the tire 1006 and thus increasing the volume of air exiting the tire 1006. This effectively prevents the wheel valves 10, 10' from prematurely closing. If both valves 412' were opened at the same time, a large differential pressure across the wheel valve 10, 10' would cause the wheel valve 10, 10' to close. By operating the valves 412' in this manner, the method allows for controlled deflation of the tires 1006. This is also why the exhaust valve 416' is present as when the exhaust valve 416' is energized, this opens an even larger air exit path, causing an abrupt pressure differential across the wheel valve 10, 10' to close the valves 10, 10', even at low tire pressures.

The electrical box 430' encloses the circuit board 450' which is operably wired directly to a pair of connectors 460' and a replaceable pressure transducer 414' ported to the board 450' inside of a pipe plug 462' which is ported directly into the airway system 410' in the manifold block 403' and wired directly to the board 450' in the box 430'. One of the connectors 460' connects the individual valves 408', 412', 416' to the board 450' to control and supply power to the valves 408', 412', 416'. The other connector 460' is connected to and preferably receives power from the controller 500 and controller-area network (CAN) bus (not shown) of the vehicle, which is known in the art for use in vehicular applications, in order to operate the system 1000. If a CAN bus is not used in the vehicle, a wire harness (not shown) can connect directly to the controller 500 from this connector 460'. Once the CTIS electrical system 1000 ties into the vehicle's CAN bus architecture, the controller 500 can monitor vehicle areas of interest to the operation of the system 1000, e.g., vehicle speed. Each of the electrical components has their own CAN Bus connection point and address. Therefore, when a command comes from our controller 500 instructing our manifold 400' to open or close a valve 408', 412' 416', these components can receive that particular information through the vehicle's CAN bus architecture. When the CTIS manifold 400' performs all instructions from the CTIS controller 500 and completes an adjustment cycle, the signals are picked up from the controller 500 and displayed on the controllers' user interface panel 550. The adjustment cycle then terminates until the next adjustment selection is made by the operator via the interface panel 550, or until the next automatic recheck cycle is initiated by the board 430' as a result of a preset recheck cycle stored within the system 1000 and utilized autonomously by the system 1000 to check the status of the tires 1006 on the vehicle. In one example, the CTIS 1000 would finish an adjustment cycle and go to sleep (be dormant) until a timer would wake up our controller 500 to make another recheck adjustment. It is also possible to tie any manufacturers Tire Pressure Monitoring System (TPMS) into our CTIS 1000, such that the CTIS 1000 could wake up in response to a detected leak from the TPMS or a combination of both. Additionally, instead of a fifteen (15) minute recheck cycle time, depending upon the desired interval, the controller 500 can have its internal clock set to recheck in 1 or 2 hours, and if the TPMS detected a leak ahead of the recheck timer, the controller 500 for the CTIS 1000 would receive this signal from the TPMS and wake up and begin an adjustment.

Looking now at FIGS. 23-26, a third embodiment of the manifold 700 is illustrated. The manifold 700 for each tire 1006 operably connected thereto includes a PO check valve assembly 7001, a PO check seat 701, a PO check activation piston 702, a pilot pressure port 703, a pressure sensor 704, a control circuit board 705, a control box housing 706, a check valve 707, and exhaust passage 708 to the valve 707, a connection 709 to the wheel valve 10, 10', a secondary exhaust orifice 710, a primary exhaust orifice 711, a pressurized air passage 712 connected to the compressed air source 1002, a solenoid valve 713, and a PO check exhaust passage 714. The manifold 700 also includes a compressor inlet 715 that connects to each pressure passage 712, a PO check exhaust port 716, an exhaust valve 717 and a POC valve 718.

Figure 26:
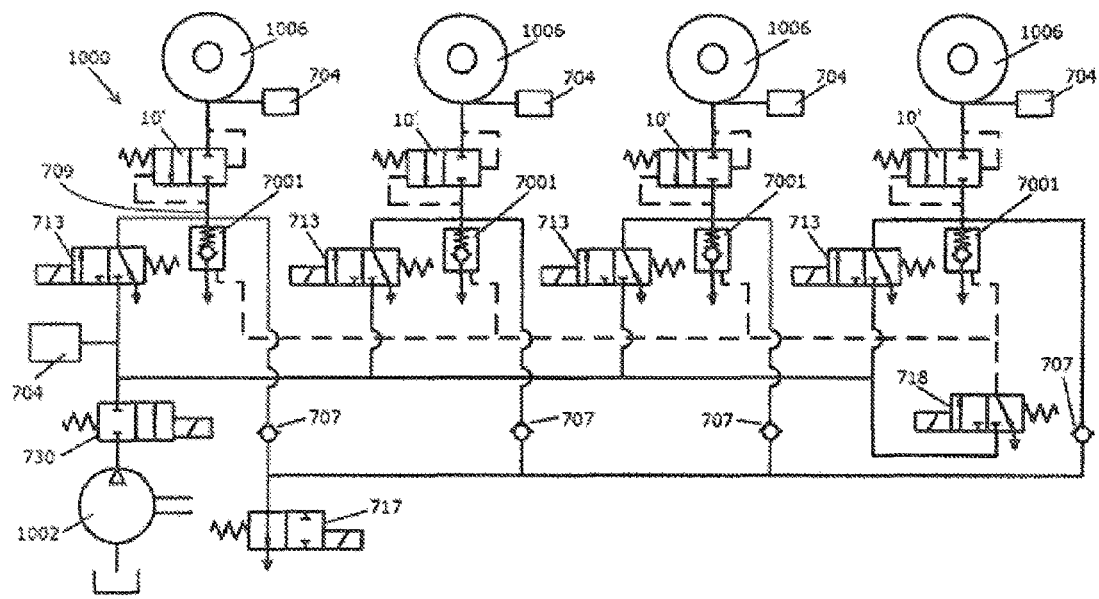
FIG. 26 is a schematic view of a central tire inflation system including the manifold of FIG. 23.

In FIG. 26 the system 1000 including the manifold 700 is schematically illustrated. The goal of the Independent CTIS 1000 is to allow for monitoring, inflating & deflating each tire 1006 independently or to perform these actions on multiple tires 1006 at once, to various pressure levels depending on road conditions or activity.

To Inflate Tires:
1. Activate solenoid 713 to allow compressed air to build enough pressure in the system. Once the pressure equals or slightly exceeds the tire pressure in wheel valve 10, 10', the wheel valve 10, 10' will open allowing more air to enter the tire 1006.
   a. Note that when the valve 713 is open, air pressure will pass through check valve 707 connected to valve 713, but will not go past the other check valves 707 or the exhaust valve 717.
2. Once the selected tire pressure is reached, which is monitored by the 704, the exhaust valve 717 is energized while at the same time the valve 713 is de-energized, allowing a surge of exhausting air to cause a large differential in pressure across the wheel valve 10, 10', causing the wheel valve 10, 10' to snap shut, locking air in tire 1006.
3. If more than one tire 1006 is needed to be inflated, the other solenoid inflation valves 713 are activate at the same time as discussed previously.

To Deflate Tires:
1. Activate solenoid 713 to allow compressed air to build enough pressure in the system. Once the pressure equals or slightly exceeds the air pressure in wheel valve 10, 10', the wheel valve 10, 10' will open allowing more air to enter the tire 1006.
2. Once the wheel valve 10, 10' opens, the solenoid valve 713 is de-energized, allowing the tire 1006 to start to deflate through a controlled exhaust orifice 710, 711. Once the tire pressure drops to a calibrated level, which is monitored by the pressure transducer/sensor 704 within the system, pilot actuation valve 7001 is energized, causing the check valve 7001 to open, which opens another orifice, allowing for more deflation speed as pressure decays.

Additional inflation/deflation and other sequencing can be accomplished through the system software with this circuit.

Figure 21:
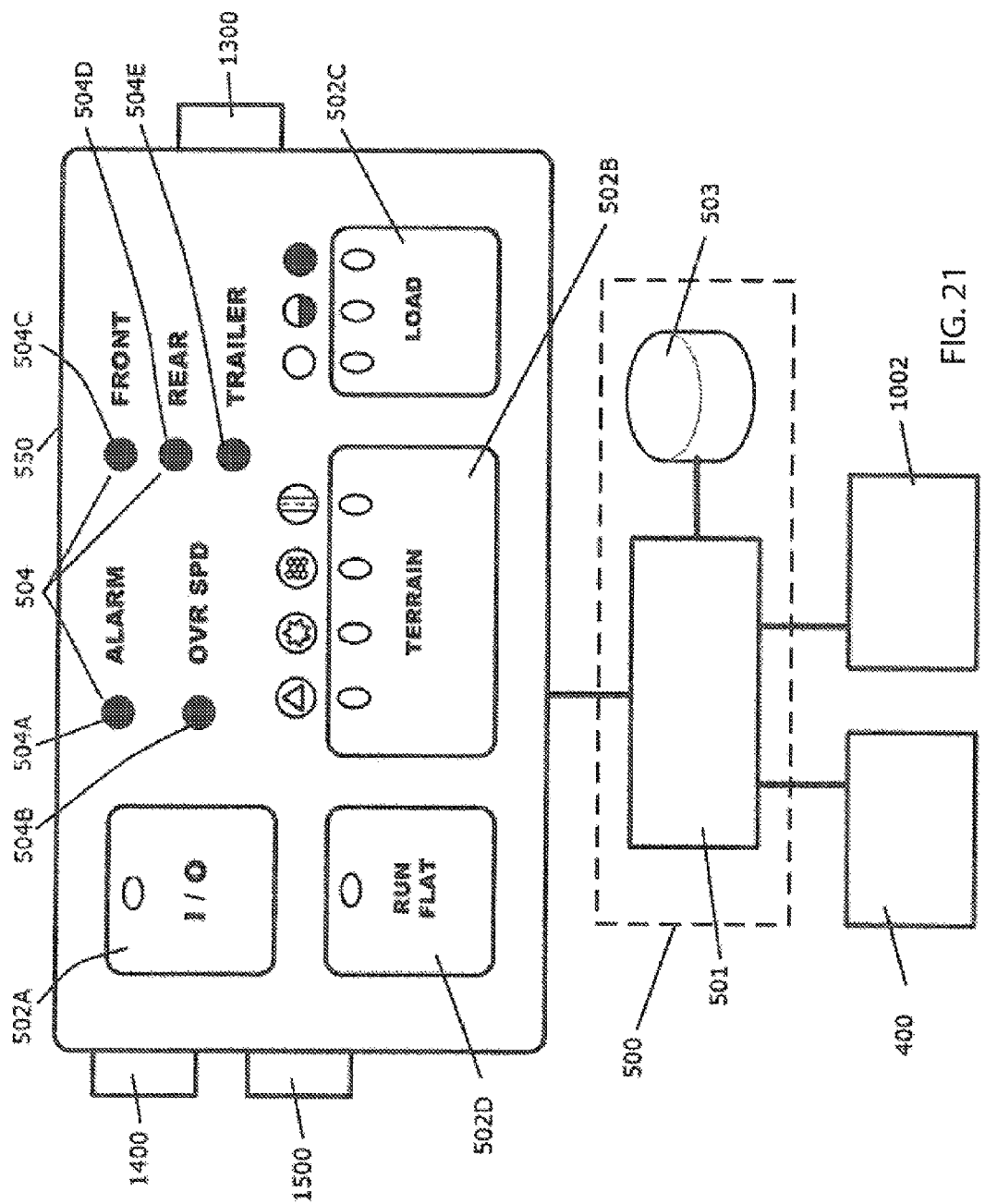
FIG. 21 is a top plan view of a controller used to operate the central tire inflation system including the valve of FIG. 1.
Figure 22:
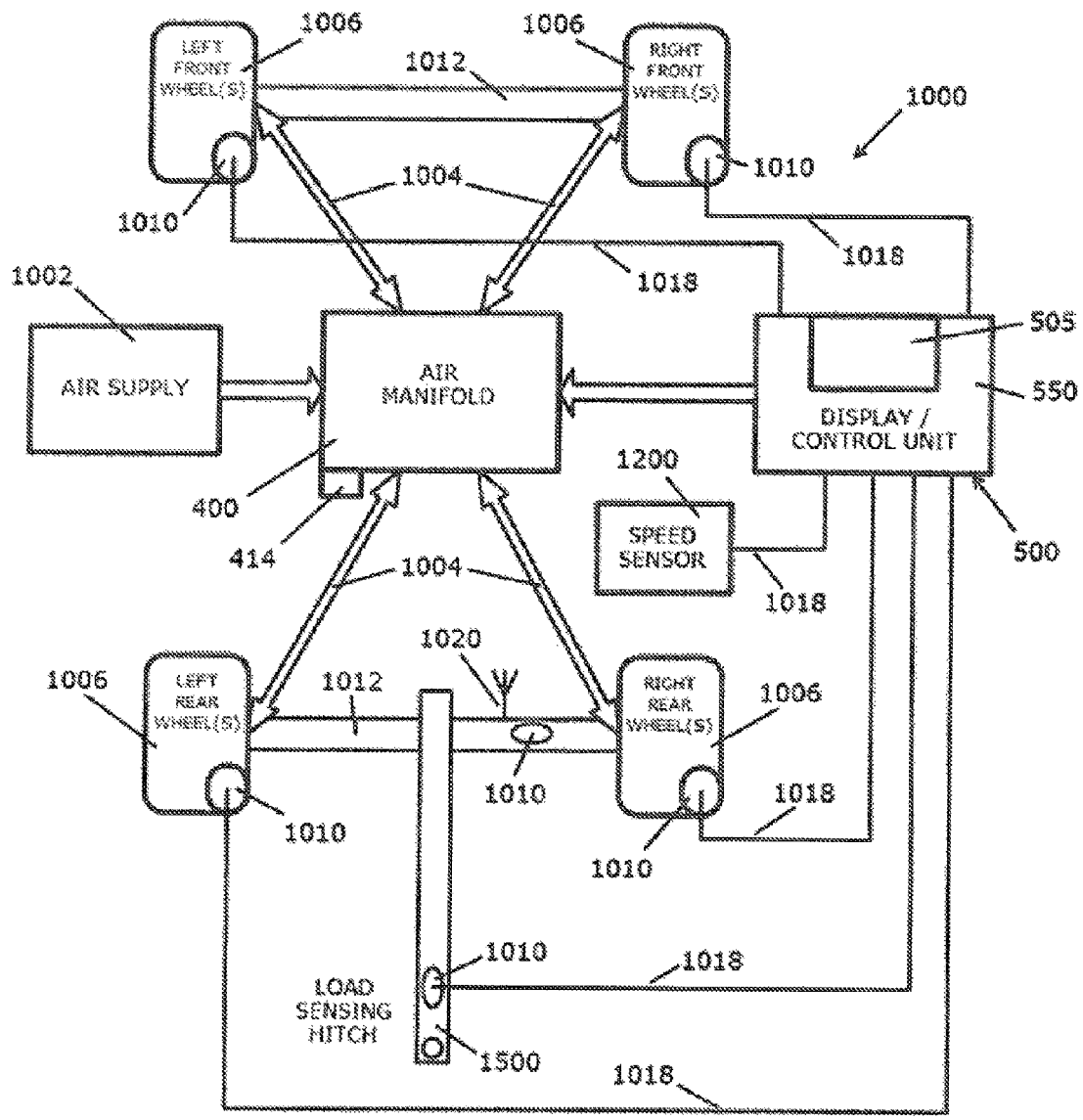
FIG. 22 is a schematic view of a vehicle including a central tire inflation system including a valve, a manifold, a controller and various sensing devices'
Figure 23:
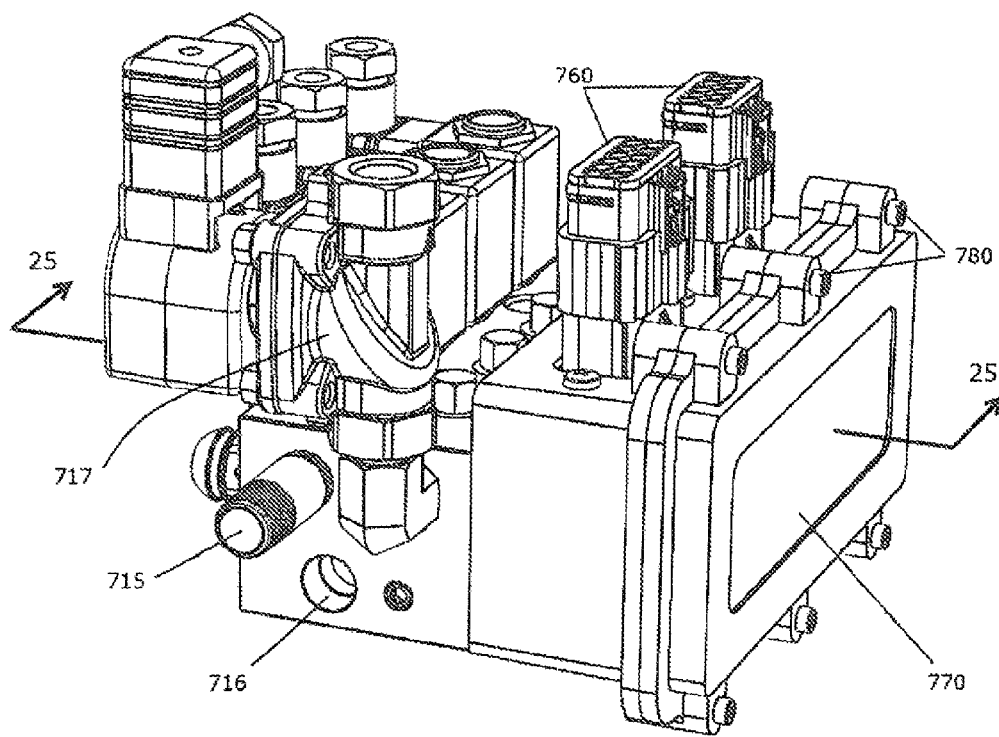
FIG. 23 is a side isometric view of a third embodiment of the manifold of FIG. 16.
Figure 24:
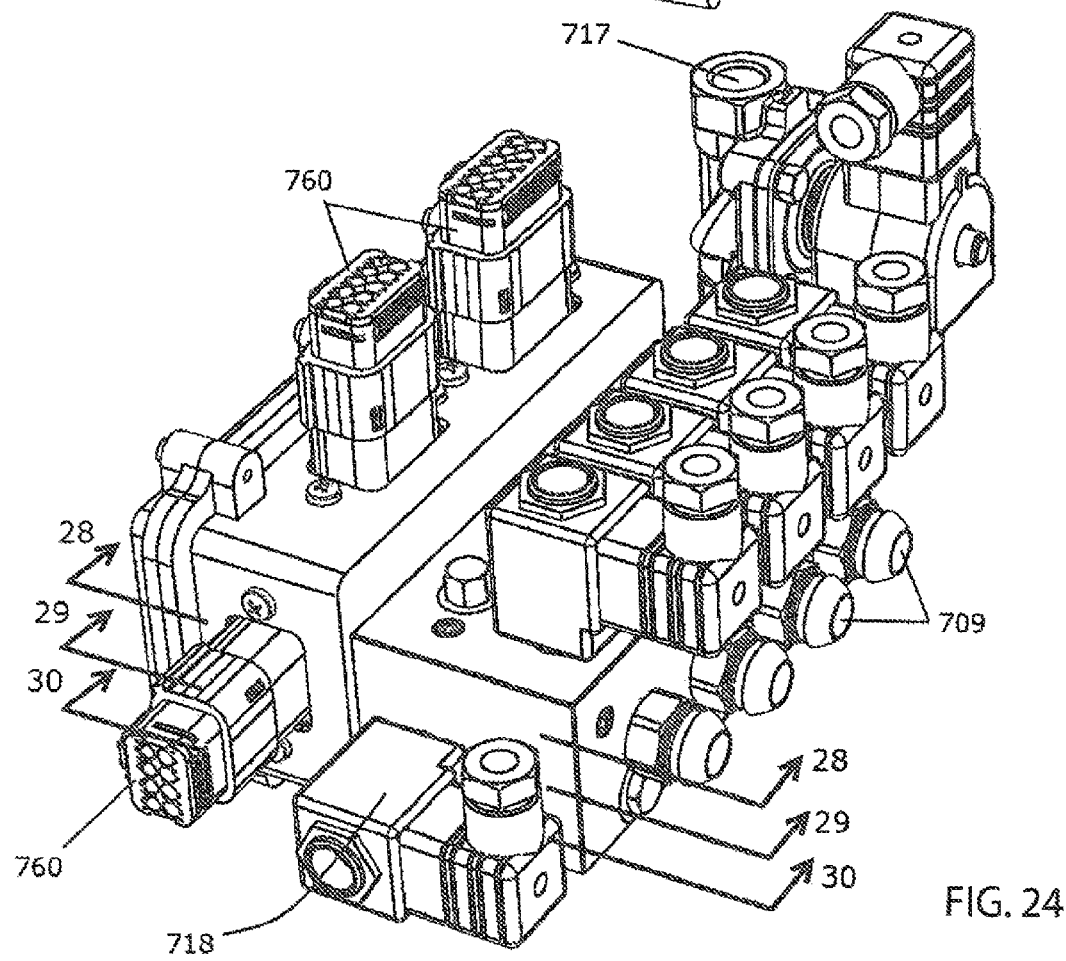
FIG. 24 is a top isometric view of the manifold of FIG. 23.
Figure 25:
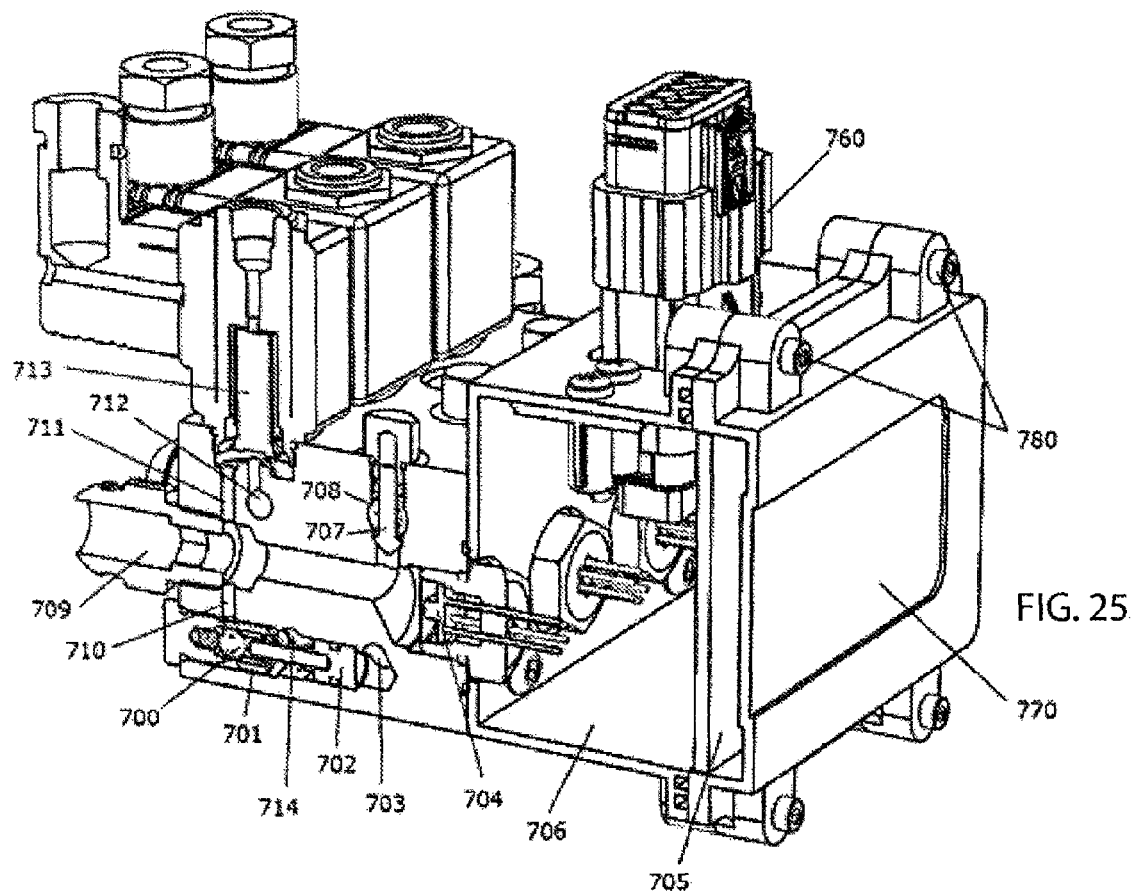
FIG. 25 is a cross-sectional view along line 25-25 of FIG. 23.

Referring now to FIGS. 21 and 22, a schematic view of the controller 500 that is operably connected to the manifold 400, and in particular to the valves 408 and 412 and/or the transducer 414, as well as to the air supply 1002 of the system 1000, and to the vehicle (not shown), to enable the operator of the vehicle to control the central tire inflation system 1000 incorporating the manifold 400 and the valves 10 and/or 10' is illustrated. The controller 500 includes a suitable central processing unit 501 and an electronic storage medium 503 connected to the unit 501 and capable of storing electronic information regarding the system 1000, including, but not limited to, a number of pre-set operating parameters for the system 1000. The controller 500 is connected to the manifold 400, air supply 1002, and vehicle using any suitable circuitry, such as any existing CAN bus architecture, in order for various switches 502 disposed on a control panel 550 for the controller 500 and operably connected to the unit 501 to connect and control the operation of the valves 408 and 412, as well as to operate the pressurized air supply or compressor 1002, as well as to register and display pressure readings from the pressure transducer 414. In one embodiment, to assist in the ability to position the control panel 550 where desired, i.e., in an easily accessible location within the vehicle, the control panel 550 is designed to have a small size, such as under three (3) inches in height, and under five (5) inches in width, and more preferably about two (2) inches in height and about three (3) inches in width, and about 0.75 inches thick. With this reduced size, the control panel 550 can be located in a variety of locations within the vehicle using any number of known attachment mechanisms or devices.

In addition, the controller 500 can provide the operator with the ability to determine and/or set various operating parameters for the tires of the vehicle, such as those based on the conditions in which the vehicle is being operated, as indicated by the LEDs 504A-E on the control panel 550 that are also operably connected to the controller 500 to indicate operating parameters of the manifold 400 and the valves 10 and 10', as well as other parts of the vehicle, as necessary or desired. Thus, the central processing unit 501 employed with the controller 500 in a known manner can have a number of pre-set conditions stored in the suitable electronic storage medium 503 that can be accessed and utilized by the controller 500 and central processing unit 501 to control the system 1000 when certain switches 502 on the control panel 550 are selected by an operator to indicate the desired conditions for the vehicle. For example, the proper tire pressurizations for the tires 1006 to be used in various terrains or when carrying various loads can be stored in the controller 500 and accessed by the controller 500 upon activation of selected switches 502 to automatically set the pressures for the tires at the levels optimized for operation of the vehicle in those selected conditions, particularly when the operating conditions for the vehicle are changing and/or when the vehicle is moving. More particularly, in one embodiment the control panel 550 includes four control switches, including an on/off or power switch 520A. The panel 550 also includes a terrain selection switch 502B with four preset pressure setpoints that are stored in the storage medium 503 and corresponding operation of the vehicle on: 1) the highway or paved roads; 2) off-road or cross country; 3) mud, sand or snow; and 4) an emergency setting. Some of the benefits of this configuration for the system 1000 are greater mobility/command with one selection 502B, and greater protection to the safety of a differential lock/unlock component due to over-speed management with the CTIS Terrain selector button 502B.

A load switch 502C is also present in the panel 550 and includes three preset setpoints stored in the medium 503, namely: 1) empty; 2) half loaded; and 3) fully loaded. These switches 502B and 502C give the operator of the vehicle a total of twelve operational configurations for the system 1000 based on the options for the switches 502B and 502C, enabling the system 100 to adapt to a wide range of environmental conditions in which the vehicle is operated.

The panel 550 also includes a run-flat switch 502D that can be activate to cause the controller 500 for the system 1000 to do more frequent re-check cycles if a puncture in a tire 1006 is suspected.

In addition to the switches 502A-502D, the preferred embodiment for the control panel 550 also includes certain following LED indicators 504A-E and display 505. Indicator 504A is an alarm LED to alert the operator that the system 1000 is not working properly. This indicator 504A can illustrate the malfunctioning of the system 1000 as a solid lit indicator 504A, indicating vehicle low air supply before entering the manifold 400, 400', or a flashing indicator 504A, indicating a leak within the system 1000. Indicator 504B indicates an over speed operating condition if operator is over speeding (as a result of information provided by a speed sensor 1200) for a particular terrain pressure setpoint, where the indicator 504B will flash for thirty (30) seconds. If operator hasn't slowed vehicle to recommended speed within that time, the controller 500 will adjust the configuration for the system 1000 to the next higher terrain setpoint as a preventative safety feature for the vehicle operation. Also, indicators 504C-E can illustrate conditions where the front (504C), rear (504D) or trailer (504E) tires are inflating or deflating. The display 505 gives a visual indication of the operating parameter, e.g., pressure, load, etc. of the vehicle as determined by the controller 500.

Referring now to FIG. 22, to provide the information to be used in determining the parameters illustrated in the display 505, the controller 500 can also be operably connected to a number of sensing devices 1010 positioned at specific locations on the vehicle, e.g., on the wheels or tires 1006, axles 1012, and/or a load attachment device or hitch 1500, among other locations. The information provided to the controller 500 by these sensors 1010, e.g., the air pressure in the tires 1006, the rotational speed of the axles 1012, and/or the stress exerted on the hitch 1500 by a load, can be utilized by the controller 500 to provide indications for the operating conditions of the vehicle to the operator to enable the operator to adjust the inflation of the tires 1006 using the system 1000, as necessary. Additionally, the controller 500 can use the information from the sensors 1010 to automatically adjust the inflation of the tires 1006 using the manifold 400 as a result of the sensed conditions.

The various sensing devices 1010 communicate the information sensed by the device along a suitable communication line 1018 to the control unit or controller 500. The controller 500 can be configured to have at least two modes, a manual mode and an automatic mode, each active using a mode select button 1300 on the controller 500. When the controller 500 is in the automatic mode, the controller 500 derives control signals to be supplied to air manifold 400 based at least partly on loads sensed by the various sensors 1010. This automatic mode selection 1300 takes a significant portion of human error out of selecting the incorrect operating conditions and/or load selection. Additionally, the automatic mode 1300 can provide immediate air to a leak to minimize damage to tire, wheel, RunFlat, and vehicle, and crew. and would lessen wear and tear on the axle wheel-end air seals, resulting in less maintenance for the vehicle.

When the controller 500 is in the manual mode, the control signals are derived based on the settings of operator input devices, i.e., an increase increment button 1400 and a decrease increment button 1500.

Control signals from controller 500 control the actions of solenoid operated valves 408 and 412 in the manifold 400, as well as to operate the pressurized air supply or compressor 1002 in a selective manner. For example, if the controller 500 demands that one or more of the tires 1006 needs more pressure, valve 408 in air manifold 400 is opened thereby causing pressurized air from air supply 1002 to be delivered through air line 1004 to the tire 1006 of that wheel 16. Preferably the tires 1006 all have dedicated hub and axle combinations (not shown) which allow delivery of air to the tires 1006 while still allowing rotation of the wheels 16 and sealing the tires 1006 from substantial air leakage. Conversely, if the controller 500 demands that one or more wheels 16 needs less pressure, an air release valve 412 in air manifold 400 is opened by the controller 500 thereby drawing pressurized air from tire 1006 on that wheel 16 and causing a drop in pressure of the wheel 16.

By pressing mode select button 1300, an operator may choose to place central tire inflation system 1000 into an automatic mode. In automatic mode, the controller 500 monitors and controls the inflation of all tires 1006 in the system 1000 based at least partly on the operating loads placed on the wheels 16. In certain embodiments, the controller 500 may be a microprocessor based control or an analog control. In other embodiments, the controller 500 may be configured to carry out any of a number of regulating control algorithms including, but not limited to, PID control, PD control, proportional control, optimal control, linear quadratic regulation, digital control, intelligent control, fuzzy logic control, and any other suitable control algorithms.

Variations in the load placed on the tires 1006 which are caused by forces exerted on the vehicle during operation can be measured by several different methods using different sensors and load transducers 1010. In one embodiment, the load on the wheel axles 1012 is measured. For example, strain gauge load transducers or sensors 1010 are mounted on the axle housing to measure the vertical shear force. The vertical shear force on the axle, divided by the number of tires interconnected with the axle, determines the tire load.

In an alternative embodiment, the vehicle has a suspension. Tire load is determined by knowledge of the suspension stiffness and by sensing the deflection of the suspension.

Further, in an alternative embodiment, a load pin is used on the front axles to measure load on front wheels 16. For example, a load pin 1010 can be inserted in the wheel pivots to measure the tire load.

Still further, in an alternative embodiment, tire loads are determined by measuring load on a hitch assembly 1500 (e.g., a three-point hitch assembly) having a sensor 1010 thereon. The position and forces on members of the hitch assembly can be measured with strain gauges or load pins or position sensors or other sensing devices 1010 that determine the line of draft of the implement. The operator calculates or measures the ballasted weight of the vehicle and enters it into the system 1000. The weight transfer from the hitch to the vehicle can be calculated from the line of draft vector, sensed by the hitch sensors 1010. From the line of draft vector, the actual working load on the axles can be calculated. Once the working load on the axles is calculated, the tire load can easily be determined by dividing the load on the axle by the number of tires interconnected with the axle.

Still further, in an alternative embodiment, tire loads are determined by measuring load on a trailer drawbar (not shown). The load on the drawbar can be measured using a strain gauge mounted on the drawbar, or by using another suitable device. By measuring the drawbar load, the line of draft vector can be determined. With the line of draft vector, the wheel loads may be calculated as described above for the hitch assembly.

Still further, loads on other work vehicle attachments (such as shovels, jack hammers, front-end loaders, etc.) contribute to wheel loads. These attachment loads can be accounted for in the total wheel load by including strain gauges or load pins at the mounting points of the attachments. For example, load pins used to couple a loader attachment and associated lift cylinders to the vehicle frame may measure the forces exerted by the loader attachment on the vehicle. The loader attachment position must also be measured to determine how the weight is transferred to the vehicle wheels.

Variations in tire load can also be caused by changes in the amount of material stored in or on the vehicle. For example, the load on the tires of a vehicle will change as the material being carried is loaded and unloaded, or as it shifts during transportation.

For another example, the load on the tires of a dump truck will change depending on the amount and type of material being hauled. These changes in tire load can be sensed using appropriate sensors, and the sensed load can be used to adjust the inflation pressures of the tires.

Once the tire load has been determined, the speed, tire size, and tire rating, are all communicated to controller 500. This information is needed for the controller to provide commands to adjust the tire inflation pressure properly. In one embodiment, the vehicle speed is measured from wheel speed sensors or radar mounted on the vehicle. In one embodiment, the operator manually inputs the tire size and rating, however, the information may alternatively be obtained through a wireless device imbedded in the tires that communicates a signal to control 500.

Further, drive parameters, such as the fueling curve, the transmission, manual four wheel drive, differential locks, tire pressure, or other drive train parameters could be modified based on the terrain setting, vehicle slip, or vehicle load to provide increased traction and power.

When the control unit or controller 500 is in automatic mode and the proper parameters have been set, the individual tire loads will be measured or sensed, and controller 500 determines the proper inflation pressure for the particular combination of load and speed from lookup tables provided by the tire manufacturers. The controller 500 also receives sensed or measured tire pressure from pressure transducer 414. Based upon the measured tire pressure and the desired tire pressure, controller 500 communicates a signal to air manifold 400 to inflate or deflate the tire appropriately.

In another embodiment, the CTIS 1000 indicates to the operator the severity and location of any leaks in the tires. The leak severity is determined by measuring the time rate of change of the pressure (sensed using a pressure sensor 1010 or the pressure transducer 414) in the tires 1006. The system 1000 can compensate for small leaks by adding air to the tires as required. In addition, the CTIS 1000 can send a signal to the vehicle suspension to pick up (retract) the suspect wheel-end to eliminate the possibility of self destruction of tire & wheel assembly in the event that the system 1000 determines the tire 1006 cannot be reinflated.

Further, if the pressure in the air supply to the manifold is too low, the system disables and warns the operator that CTIS 1000 or other pneumatic systems, such as the brakes, may fail to function properly due to inadequate pressure in the compressor or air supply 1002.

In addition to the description of the previous embodiments, the valve 10 and manifold 400 of the present invention can also be modified in various manners to provide added functionality to the valve 10 and manifold 400. For example, the various structural components of the valve 10 and manifold 400 can be formed from any suitable fluid-impervious material, such as a metal or hard plastic, to reduce the overall weight of the components. Also, the communications between the various sensing devices 1010 and the controller 500 can be made wirelessly, such as through radio waves directed from an antenna 1020 on the sensing device 101 to the controller 500 in a known manner. Also, instead of attaching the CTIS 100 directly to the existing CAN bus of the vehicle, the CTIS 1000 can be formed with a separate CAN bus attachable to the vehicle to enable the CTIS 1000 to operate independently of the existing CAN bus, and optionally on the same or a different power source.

Various alternatives are contemplated as being within the scope of the following claims, particularly pointing out and distinctly claiming the subject matter regarded as the invention.

We hereby claim:

1. A central tire inflation system for a work vehicle supported by a set of inflatable wheels, the central tire inflation system comprising:
   a) a load transducer coupled to the work vehicle and configured to sense a load of an implement connected to the vehicle and to generate load signals representative thereof;
   b) an electronic control unit coupled to the load transducer configured to receive the load signals and to generate control signals at least partly in response thereto;
   c) an air manifold configured to receive the control signals from the electronic control unit, the control signals controlling actions of the air manifold to regulate the air supplied to the set of inflatable wheels; and
   d) at least one wheel valve operably connected to a wheel of the vehicle and including a casing securable to a rim of a vehicle, the casing having an open end and a closed end defining a cavity therein, a main valve body engaged with the casing within the cavity and extending outwardly from the casing through the open end, the main body including at least one aperture located at each of a lower and an upper end of an interior thereof; the lower aperture positioned in sealing engagement with a pressurized air inlet, a valve member movably disposed within the interior of the main body and sealingly engageable with the main body, the valve member including a number of openings therein to enable fluid communication between the lower aperture in the main body and the cavity in the casing through the valve member, and a biasing member disposed between the main body and the valve member.

2. The central tire inflation system of claim 1, wherein the load transducer is configured to sense the loads placed on a hitch assembly of the work vehicle.

3. The central tire inflation system of claim 1, wherein the load transducer comprises at least one load pin, the at least one load pin communicating an electrical signal to the electronic control unit, the electrical signal having a substantially known relationship to a force applied to the at least one load pin.

4. The central tire inflation system of claim 1, wherein the electronic control unit is configured to generate display signals, the central tire inflation system further comprising:
   a) a visual display coupled to the electronic control unit configured to provide central tire inflation system information to a user in response to the display signals; and
   b) a manual control input coupled to the electronic control unit for generating manual control signals, wherein, when the electronic control unit operates in a manual mode, the control signals provided to the air manifold are based upon the manual control signals.

5. The central tire inflation system of claim 1 further comprising a speed sensor, the speed sensor communicating an electrical signal to the electronic control unit, the electronic control unit configured to generate the control signals based on the electrical signal.

6. The central tire inflation system of claim 1 wherein the valve member of the wheel valve comprises:
   a) a hollow lower section disposed within the interior of the main body;
   a narrow central section connected to the lower section and including the number of openings therein; and
   c) a wide upper section connected to central section opposite the lower section, the upper section including a top portion sealingly engageable with the main body.

7. The central tire inflation system of claim 1 wherein the cavity of the wheel valve is in direct fluid communication with the interior of the tire to allow the air pressure within the tire to urge the valve member into a closed position against the bias of the biasing member.

8. A central tire inflation system to be utilized on a vehicle, the system comprising:
   a) a load transducer coupled to the vehicle for generating sensed load signals representative of operating loads placed on inflatable wheels of the vehicle;
   b) an electronic control unit mounted on the work vehicle and coupled to the load transducer, wherein the electronic control unit is configured to receive the sensed load signals and to generate control signals at least partly in response thereto;
   c) an air supply capable of supplying pressurized air;
   d) at least two air lines coupled to the inflatable wheels;
   e) an air manifold mounted on the work vehicle and coupled to the air supply, the at least two air lines, and the control unit, wherein the air manifold receives the control signals from the electronic control unit, the control signals controlling actions of the air manifold to regulate the distribution and amount of pressurized air supplied via internal passages in the manifold to the at least two air lines through a manifold fluid outlet from the air supply entering the internal passages through a manifold fluid inlet;
   f) at least one wheel valve including a casing secured to a rim of wheel, the casing having an open end and a closed end defining a cavity therein that is in fluid communication with an interior of a vehicle tire, a main valve body engaged with the casing within the cavity and extending outwardly from the casing through the open end, the main body including at least one aperture located at each of a lower and an upper end of an interior thereof, a valve member movably disposed within the interior of the main body and sealingly engageable with the main body, the valve member including a number of openings therein to enable fluid communication between the lower aperture in the main body from at least one of the air lines from the manifold and the cavity in the casing through the valve member to the tire, and a biasing member disposed between the main body and the valve member;

wherein the load transducer comprises at least one sensing device, the sensing device communicating an electrical signal to the electronic control unit, the electrical signal having a substantially known relationship to a force measured by the sensing device.

9. The system of claim 8 wherein the manifold further comprises:
   a) a first control valve disposed between the fluid inlet and the fluid outlet; and
   b) a second control valve disposed between the fluid outlet and a pressure relief fluid outlet.

10. The system of claim 9 further comprising a pressure transducer operably connected to the internal passages within the housing between the fluid inlet and the fluid outlets to monitor the fluid pressure in the manifold.

11. A method of regulating the tire pressure of a tire on a vehicle, the method comprising the steps of:
   a) providing a central tire inflation system comprising:
      i) at least one wheel valve including a casing secured to a rim of a wheel, the casing having an open end and a closed end defining a cavity therein in fluid communication with an interior of a vehicle tire, a main valve body engaged with the casing within the cavity and extending outwardly from the casing through the open end, the main body including at least one aperture located at each of a lower and an upper end of an interior thereof, a valve member movably disposed within the interior of the main body and sealingly engageable with the main body, the valve member including a number of openings therein to enable fluid communication between the lower aperture in the main body and the cavity in the casing through the valve member, and a biasing member disposed between the main body and the valve member;
      ii) a manifold secured to the vehicle and operably connected to the at least one valve, the manifold having a unitary housing including a fluid inlet and a number of fluid outlets interconnected with one another by internal passages within the housing and at least one control valve operably connected to the internal passages within the housing between the fluid inlet and the fluid outlets;
      iii) a pressurized fluid supply operably connected to the manifold to supply the pressurized fluid to the manifold; and
      iv) a controller operably connected to the at least one valve of the manifold and to the pressurized fluid supply to selectively control the operation of the at least one valve and the pressurized air supply and to at least one sensing device positioned on the vehicle to monitor one or more operating conditions of the vehicle;
   b) generating sensed signals representative of operating conditions of the vehicle by the at least one sensing devices;
   c) generating control signals at least partly in response to the sensed signals; and
   d) regulating the air supplied to the tire based on the control signals.

12. The method of claim 11 wherein the flow of pressurized fluid has a pressure greater than the fluid pressure within the tire to inflate the tire.

13. The method of claim 11 wherein the flow of pressurized fluid has a pressure less than the fluid pressure within the tire to deflate the tire.

14. The method of claim 11, further comprising receiving additional control signals from a manually-operated switch and regulating the air supplied to the tire based on the additional control signals.

* * * * *

UNITED STATES PATENT AND TRADEMARK OFFICE
CERTIFICATE OF CORRECTION

PATENT NO. : 8,844,596 B2  
APPLICATION NO. : 12/967745  
DATED : September 30, 2014  
INVENTOR(S) : Martin A. Medley et al.

Page 1 of 1

It is certified that error appears in the above-identified patent and that said Letters Patent is hereby corrected as shown below:

IN THE CLAIMS

Claim 1, column 17, line 46, delete ";" and substitute therefor -- , --;

Claim 6, column 18, line 18, before "a" insert -- b) --.

Signed and Sealed this  
Sixth Day of January, 2015

Michelle K. Lee  
*Deputy Director of the United States Patent and Trademark Office*